United States Patent
Zhou et al.

(10) Patent No.: US 10,900,443 B2
(45) Date of Patent: Jan. 26, 2021

(54) OPTIMAL FEEDBACK HEAT ENERGY INTERNAL COMBUSTION ENGINE AND APPLICATIONS

(71) Applicant: DE ZHEN Corporation Pty Ltd., Panania (AU)

(72) Inventors: Han Yu Zhou, Panania (AU); Hao Zhou, Panania (AU)

(*) Notice: Subject to any disclaimer, the term of this patent is extended or adjusted under 35 U.S.C. 154(b) by 986 days.

(21) Appl. No.: 14/856,395

(22) Filed: Sep. 16, 2015

(65) Prior Publication Data
US 2016/0053722 A1  Feb. 25, 2016

Related U.S. Application Data

(63) Continuation-in-part of application No. 13/498,313, filed as application No. PCT/AU2009/001323 on Oct. 6, 2009, now abandoned.

(51) Int. Cl.
*F02K 7/02* (2006.01)

(52) U.S. Cl.
CPC ............ *F02K 7/02* (2013.01); *F05D 2220/76* (2013.01); *F05D 2220/80* (2013.01); *F05D 2240/35* (2013.01); *F05D 2270/07* (2013.01); *Y02T 50/60* (2013.01)

(58) Field of Classification Search
CPC ... F02K 7/02; F02K 7/06; F02K 7/075; F02C 7/264; F02C 5/00; F02C 5/12; F02C 7/26; F23R 7/00
USPC ............. 60/39.76, 39.77, 39.78, 39.79, 39.8, 60/39.81, 39.821, 39.822, 39.823, 39.824, 60/39.825, 39.826, 39.827, 39.82, 39.38, 60/39.39, 39.4; 431/346, 3, 1
See application file for complete search history.

(56) References Cited

U.S. PATENT DOCUMENTS

| | | | | |
|---|---|---|---|---|
| 3,708,961 A * | 1/1973 | Kimmel, III | ............... | F01N 3/30 96/372 |
| 4,917,596 A * | 4/1990 | Saito | .......................... | F23C 6/02 431/1 |
| 5,361,581 A * | 11/1994 | Clark | ....................... | F02K 5/023 60/247 |
| 5,937,635 A * | 8/1999 | Winfree | ..................... | F02K 7/06 431/1 |
| 5,983,624 A * | 11/1999 | Anderson | .................. | F02C 3/02 60/39.38 |
| 7,111,463 B2 * | 9/2006 | Sprouse | ................... | F02C 7/264 60/39.37 |
| 9,512,805 B2 * | 12/2016 | Snyder | ....................... | F23R 7/00 |
| 2004/0216464 A1 * | 11/2004 | Lupkes | ...................... | F02C 5/00 60/776 |
| 2005/0079461 A1 * | 4/2005 | Kasahara | ................... | F02K 7/06 431/181 |
| 2006/0213201 A1 * | 9/2006 | Lupkes | ...................... | F02C 3/16 60/776 |

(Continued)

*Primary Examiner* — Scott J Walthour
*Assistant Examiner* — William L Breazeal

(57) ABSTRACT

An internal combustion engine wherein a thermo potential heat flow in combustion is maximized by providing a feedback of an optimized amount of thermo potential heat flow that is modulated in the exhaust media, into the air intake, and a method of providing feedback comprises producing a shock wave of pulse of exhaust media and pulse of intake air on the opposite side of a high temperature shock tube thereby transferring the thermo potential heat energy flow from the exhaust media to the air intake.

15 Claims, 22 Drawing Sheets

(56) References Cited

U.S. PATENT DOCUMENTS

| | | | |
|---|---|---|---|
| 2007/0157625 A1* | 7/2007 | Snyder | F23C 15/00 |
| | | | 60/776 |
| 2007/0180832 A1* | 8/2007 | Kenyon | F02K 7/02 |
| | | | 60/776 |
| 2009/0102203 A1* | 4/2009 | Lu | F02C 5/12 |
| | | | 290/40 R |
| 2010/0229529 A1* | 9/2010 | Raver | F02C 7/264 |
| | | | 60/247 |
| 2011/0146232 A1* | 6/2011 | Westervelt | F02C 5/11 |
| | | | 60/247 |
| 2017/0122265 A1* | 5/2017 | Ashmann | F02K 7/06 |

* cited by examiner

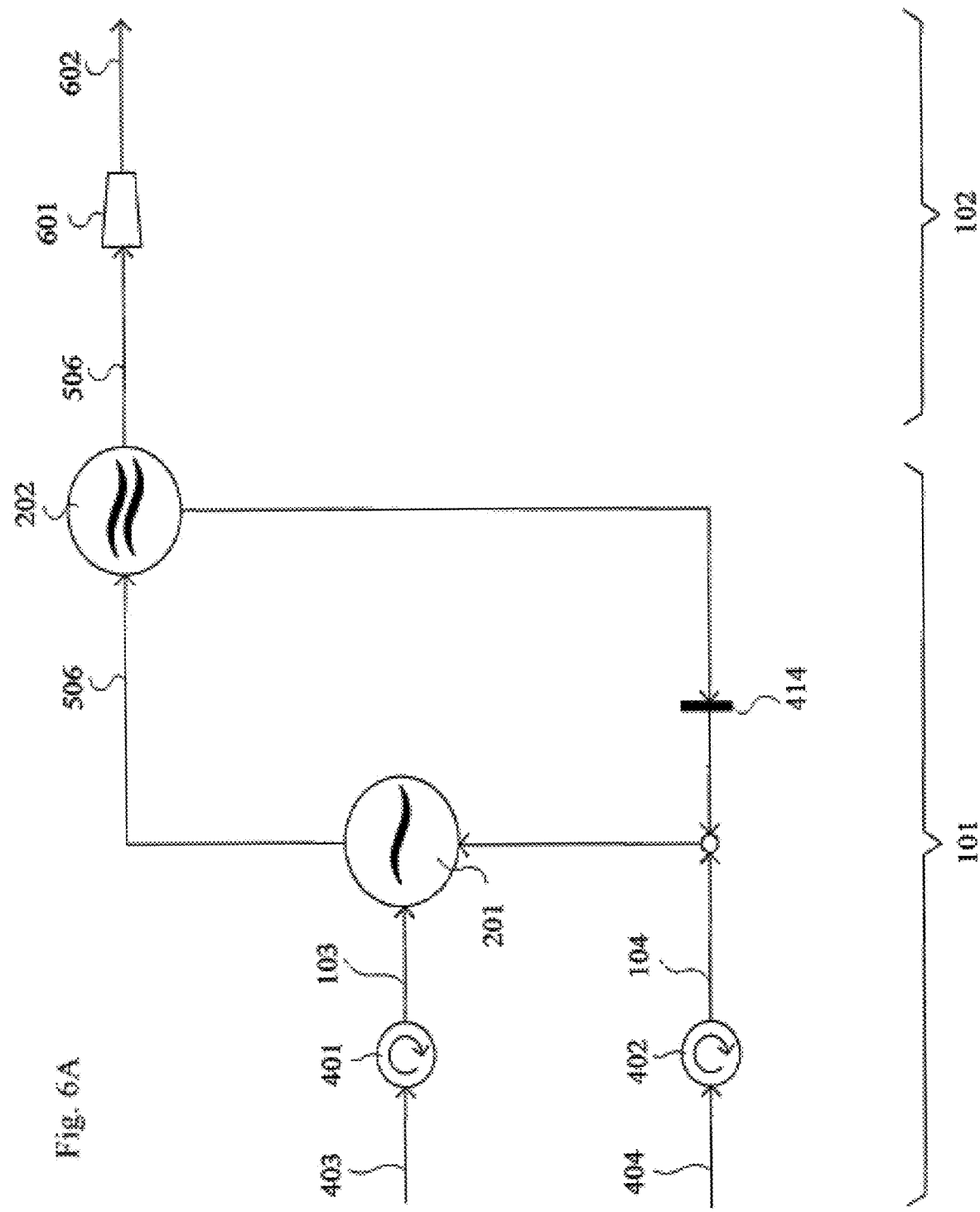

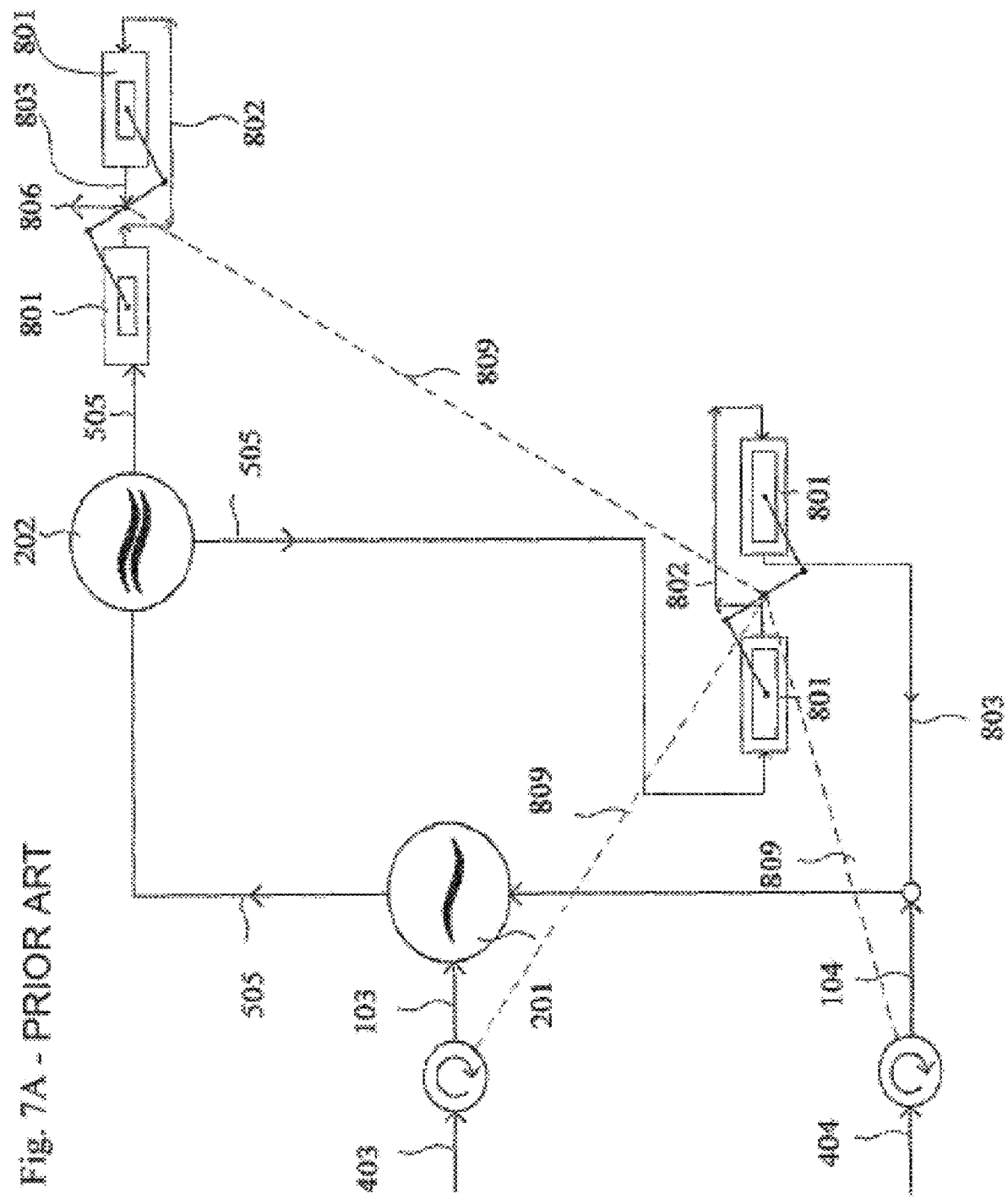
Fig. 7A - PRIOR ART

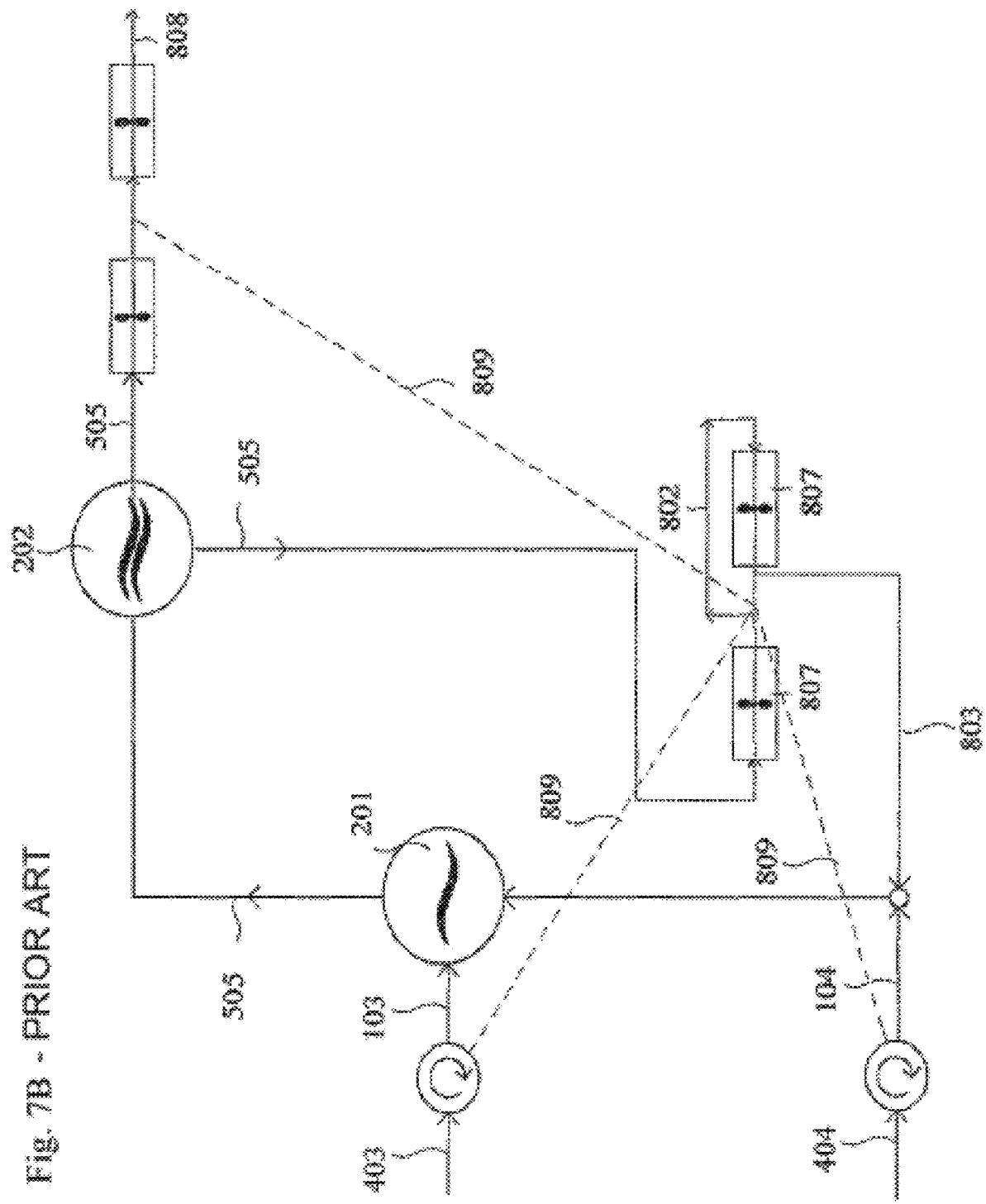

Fig. 16 Real time computer control program of active group of FHE engine automobile

OPTIMAL FEEDBACK HEAT ENERGY INTERNAL COMBUSTION ENGINE AND APPLICATIONS

CROSS-REFERENCE TO RELATED APPLICATIONS

This patent application is a continuation-in-part of U.S. application Ser. No. 13/498,313, filed Mar. 26, 2012, which is a U.S. National Stage Application filed under § 371 of PCT/AU09/01323, filed Oct. 6, 2009, each of which are incorporated herein by reference in their entirety.

FIELD

Internal combustion engine.
Field of Applications
Transportation devices, including aircrafts, cars, railway locomotives and trains, marine vessels.
Related Machines and Applications
No related internal combustion engines like the optimal feedback heat energy internal combustion engine. No transportation device powered by the optimal feedback heat energy internal combustion engine.

BACKGROUND

The working processes of conventional internal combustion engines were invented a century ago signified by moving mechanical mechanisms intervention the working processes of conventional internal combustion engines. The moving mechanical mechanisms intervention the working processes for reciprocating engine are in the form of pistons and crankshaft. And for the jet engine for aircrafts, it is in the form of rotor and shaft. It is surprising to note that present conventional internal combustion engines follow the working processes of a century ago without significant changes. The aged old working processes still dominate over the current transportation devices powered by internal combustion engines.

There are two defects inherited from the aged old working processes of conventional internal combustion engines:

The first, under the rational criterion provided by the method developed in this patent, the overall thermo efficiency of conventional internal combustion engines is extremely low. Obviously, the extremely low thermo efficiency means excessive consumption of fuel and introduces more pollution to the environment.

The other defect of conventional internal combustion engines is that the clumsy moving mechanical mechanisms 801, FIG. 7A or 807, FIG. 7B constitute the majority of the engine assembly construction. It shows the wrong impression that the pistons and crankshaft or rotor and shaft are the icon of power of internal combustion engine. The fact is that, the power of internal combustion engine is involved in the flow of heat energy bearing by the media, the products of combustion. The method developed in this patent will prove that the nature of combustion of internal combustion engine can develop the maximum power output by its own effort without intervention of foreign moving mechanical mechanisms. On the contrary the intervening moving mechanical mechanisms consume the developed power output by the media, and restrict the full capacity of power output releasing of the media. On the past decades, manufactures of internal combustion engines devoted to sophisticate the moving mechanical mechanisms of engines and its accessories. It is the main investment of the industry, and over consumes the natural resources and human resources. Further discussions of the defects of the conventional internal combustion engines are discussed below. The optimal feedback heat energy internal combustion engine (hereafter "OFHE internal combustion engine) is a heat power unit. It is easy to understand after follow the embodiments of the OFHE internal combustion engine.

The defects of conventional internal combustion engines were unperceptive at the beginning of applications of the internal combustion engines on transportation devices but seems eminent and unbearable now. The conventional internal combustion engines have restricted the renovation of transportation devices.

This patent presents the OFHE internal combustion engine operated by working processes which fully develops the capacity of hidden heat energy of fuel flow and bearing effective heat energy of flow on media. The working processes of the OFHE internal combustion engine delete all the inherited defects of conventional internal combustion engines, both reciprocating engines and jet engines for aircrafts.

Reports indicate that attempts have been made to improve the performances of present transportation devices. The efforts are deemed powerless due to the defects of conventional internal combustion engines—extremely low thermo efficiency, high weight versus power output ratio, and the parts of power production and power output are bound together by bulk moving mechanical mechanisms.

BRIEF SUMMARY

The embodiments disclosed herein is the presentation of the OFHE internal combustion engine assembly in a logical scheme of analyses and syntheses.

In the embodiments, the OFHE internal combustion engine assembly is divided into two groups according to the roles of the parts of engine playing in the working processes of the engine assembly: the active group and the passive group. The active group of engine assembly includes parts of engine directly participating the production of the thermo potential heat flow $TPH_m$ of media. Media are the products of combustion. The passive group of assembly includes parts of engine that consumes $TPH_m$ and transforms $TPH_m$ into power output of the OFHE internal combustion engine. TPH is the shortened form of the term thermo potential heat energy flow of fluid. The refractive index m on the $TPH_m$ indicates the TPH carried by media. Similarly $TPH_a$ represents TPH carried by air.

TPH is a substantial flow of heat energy modulated on the flow of fluid. TPH has three parameters: temperature t, pressure p, and velocity v. These parameters are same in values as that of the flow of fluid on which TPH is modulated. The flow of fluid modulated with TPH has heat power production capability. In the working processes of engine, only combustion processes can produce and elevate the level of $TPH_m$ and modulate it on the media, the products of combustion.

In the embodiments of analyses of active group, two methods are developed for the working processes of active group.

In the embodiments, the first method provides $TPH_m^{max}$. $TPH_m^{max}$ is very important in the development of all internal combustion engines in following aspects:

1) For any specific fuel used in internal combustion engine, there is a $TPH_m^{max}$, which can be determined by testing in laboratory monitoring the working processes of active group.

2) $TPH_m^{max}$ provides a rational criterion for thermo efficiency of all internal combustion engines as the ratio of actual power output of internal combustion engine versus $TPH_m^{max}$.

3) The first method provides the guidance for the improvement of the OFHE internal combustion engines.

In the embodiments, the second method provides optimal feedback $TPH_m^{max}$ control system of active group.

In the embodiment, the two methods are the foundation of design and construction of the OFHE internal combustion engine.

In the embodiment, the optimal feedback $TPH_m$ control system of active group is developed in details by steps and accompanied with implement of contemporary technologies.

In the embodiment, the working processes of active group are analyzed. There are no piston and crankshaft that of OTTO and Diesel cycles, nor the rotor and shaft that of jet engine for aircraft. There are three options of power output for the passive group. One option is the jet power output. The three parameters of jet power: p, v, t, are under control by the feedback $TPH_m$ control system of active group. The second option of power output of passive group is in the form of electricity. A turbo generator is adopted to the jet power to produce electricity. The third options of power output of passive group is hybrid of both jet power and electricity.

In the embodiment, the working processes of the OFHE internal combustion engine assembly are the syntheses of the working processes of active group and passive group of the engine assembly which have been analyzed below. The properties of the engine assembly are the combination of the properties of the two groups.

The design and construction procedures of the OFHE internal combustion engine assembly are the combination of the design and construction procedures of the active group and passive group.

In the embodiment of the OFHE internal combustion engine assembly, the connection between active group and passive group is a flexible duct. There is no moving mechanical mechanisms in it as that of conventional internal combustion engines. This is a favorable feature that relieve the restrictions imposed on the design of transportation devices powered by conventional internal combustion engines. The design and construction of transportation devices powered by the OFHE internal combustion engine will help to advance the transportation devices a big step forward.

In the embodiment, the applications of the OFHE internal combustion engine in the field of transportation devices are described. The applications of the OFHE internal combustion engine in the field of transportation devices are based on the following special features of the OFHE internal combustion engine.

- It has no moving mechanical mechanisms 801 or 807 in FIG. 7A and FIG. 7B as that of conventional internal combustion engines.
- It has overall thermo-efficiency much higher than that of conventional internal combustion engine.
- It has weight/power output ratio much less than that of conventional internal combustion engines.
- The OFHE internal combustion engine assembly has two groups: the active group which produces power, and the passive group which provides power output. Within the two groups there is no rigid mechanical connection. It gives the designer of transportation devices to locate the power production group and power output group in favorable position separately.
- There are three options of power output of passive group for selection: the jet power output, the electrical power output and hybrid of both jet power output and electrical power output.

The embodiment provides the renovation of all transportation devices powered by the OFHE internal combustion engine.

The embodiment provides the necessities of reconstruction of infrastructures to adopt the renovated transportation devices powered by the OFHE internal combustion engine to develop its beneficence.

The embodiment provides the emission of less carbon dioxide and other poison gas by the OFHE internal combustion engine than that of any comparable conventional internal combustion engines.

Various embodiments provide a mechanism for increasing the pressure of a fire hydrant configured to provide water to high rise building. Accordingly, the OFHE engine may be configured to operate a pump to provide propulsion forces to the fire hydrant to pump the water to high floors of a high rise building.

Moreover, various embodiments, including methods for providing energy, computer control systems, and system hardware, and the applications of the same for aircraft, cars, railway locomotives and trains, and marine vessels may be used for military purposes, and military authorities may be required to purchase licenses for appropriate patent claims for incorporation of the technology into military equipment.

Moreover, various embodiments and applications of various embodiments with aircraft, car, locomotive and trains, and marine vessels, powered by an OFHE internal combustion engine have distinguished technical features characterized by lower carbon dioxide emissions than convention transportation vehicles having the same power output, such that the OFHE internal combustion engine and its applications in transportation vehicles technically accord with the policy of reducing global carbon dioxide emissions.

BRIEF DESCRIPTION OF THE SEVERAL VIEWS OF THE DRAWINGS

In the following detailed description it will be better understood by reference to the accompanying drawing. These drawings are:

FIG. 6A and FIG. 6B are schematic representation of the working processes of the OFHE internal combustion engine assembly.

FIG. 7A and FIG. 7B are schematic representation of working processes of the conventional internal combustion engines.

DETAILED DESCRIPTION

The OFHE Internal Combustion Engine and its Applications

In order to describe the patent in logical scheme of analyses and syntheses, the OFHE internal combustion engine assembly is divided into two groups according to the roles of the parts of engine playing in the working processes of the engine assembly: the active group and passive group. The active group of engine assembly includes parts of engine directly participating the production of the thermo potential heat flow $TPH_m$ by combustion of fuel and air and modulated on media. Media are the products of combustion. The passive group of assembly includes parts of engine that consumes $TPH_m$ and transforms $TPH_m$ into power output of the OFHE internal combustion engine. The analyses of active groups and the passive group, as well as a discussion of the syntheses of the two groups of the OFHE internal combustion engine assembly are discussed below.

TPH is the shortened form of the term thermo potential heat energy flow of fluid. The refractive index m on the $TPH_m$ indicates the TPH carried by media. Similarly $TPH_a$ represents TPH carried by air.

TPH is a substantial flow of heat energy modulated on the flow of fluid. TPH has three parameters: temperature t, pressure p, and velocity v. These parameters are the same in values as that of the flow of fluid on which TPH is modulated and represent the thermo potential of the flow of fluid. In the working processes of engine, only combustion processes can produce and elevate the level of $TPH_m$ and modulate it on the media, the products of combustion.

Figure 1:
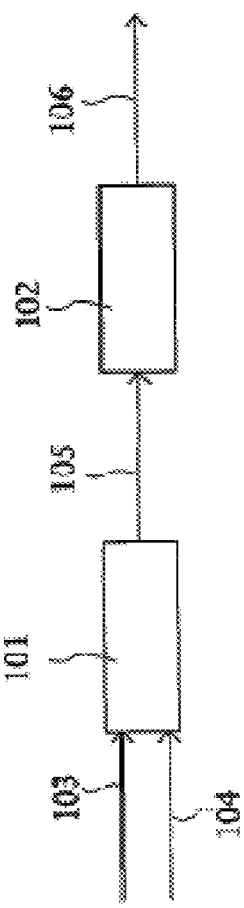
FIG. 1 is a schematic representation the OFHE internal combustion engine assembly divided into two groups.

FIG. 1 is a schematic representation of the OFHE internal combustion engine assembly divided into two groups. In the sketch, 101 is the active group, 102 is the passive group, 103 is the flow of fuel intake of the active group. 104 is the flow of air intake of active group. 105 is the $TPH_m$ produced and elevated by active group and modulated on media, the products of combustion in active group. 106 is the power output of passive group.

The Working Processes of the Active Group.

After fuel flow and air flow induced into the combustion chamber of the active group and ignited, the combustion of fuel and air start, hidden heat energy of fuel released $TPH_m$ and modulate on the media, the product of the combustion. The working processes of active group consists of two dynamic systems: the combustion dynamic system and the thermo dynamic system. The combustion dynamic system produces $TPH_m$, and the thermo dynamic system is bearing $TPH_m$, with the product of the combustion.

Figure 2:
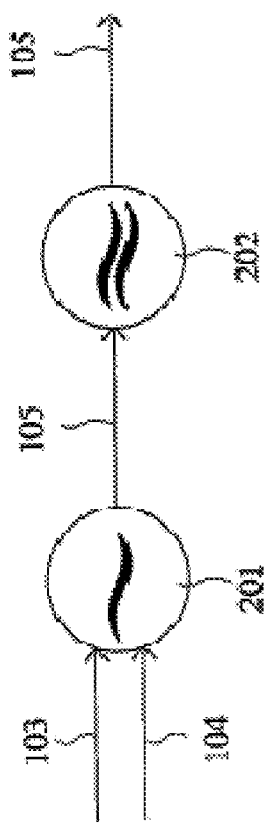
FIG. 2 is the open flow of fluid chart of active group.

FIG. 2 shows the open flow of fluid chart of the working processes of the active group 101 of FIG. 1. It is to be seen that the combustion dynamic system 201 can produce $TPH_m$ 105, but cannot store $TPH_m$ 105 and the thermo dynamic system 202 can bear $TPH_m$ 105 but cannot produce $TPH_m$ 105.

However, even if the hidden heat energy of fuel participating the combustion process were fully released, the combustion dynamic system of the active group in the open flow of fluid of working processes cannot produce the level of $TPH_m$ high enough to be transformed by passive group into power output for practical application. Human efforts is needed to elevate the level of $TPH_m$ to be transformed into power output for engineering application. Feedback $TPH_m$ to flow of air to intensify the combustion dynamic system is the only measure to elevate the level of $TPH_m$ of active group.

The active group releases the hidden heat energy of flow of fuel participating the combustion processes of the engine into the flow of effective heat energy $TPH_m$ 105. The effectiveness of active group 101 depends on the mutually cooperation of the combustion dynamic system 201 and thermo dynamic system 202. The combustion dynamic system 201 produces $TPH_m$ 105 modulated on the media, the products of combustion processes. And the thermo dynamic system 202 maneuvers the media bearing with $TPH_m$ 105 and conveys $TPH_m$ 105 to the passive group 102 which transforms $TPH_m$ 105 into power output 106.

Figure 3:
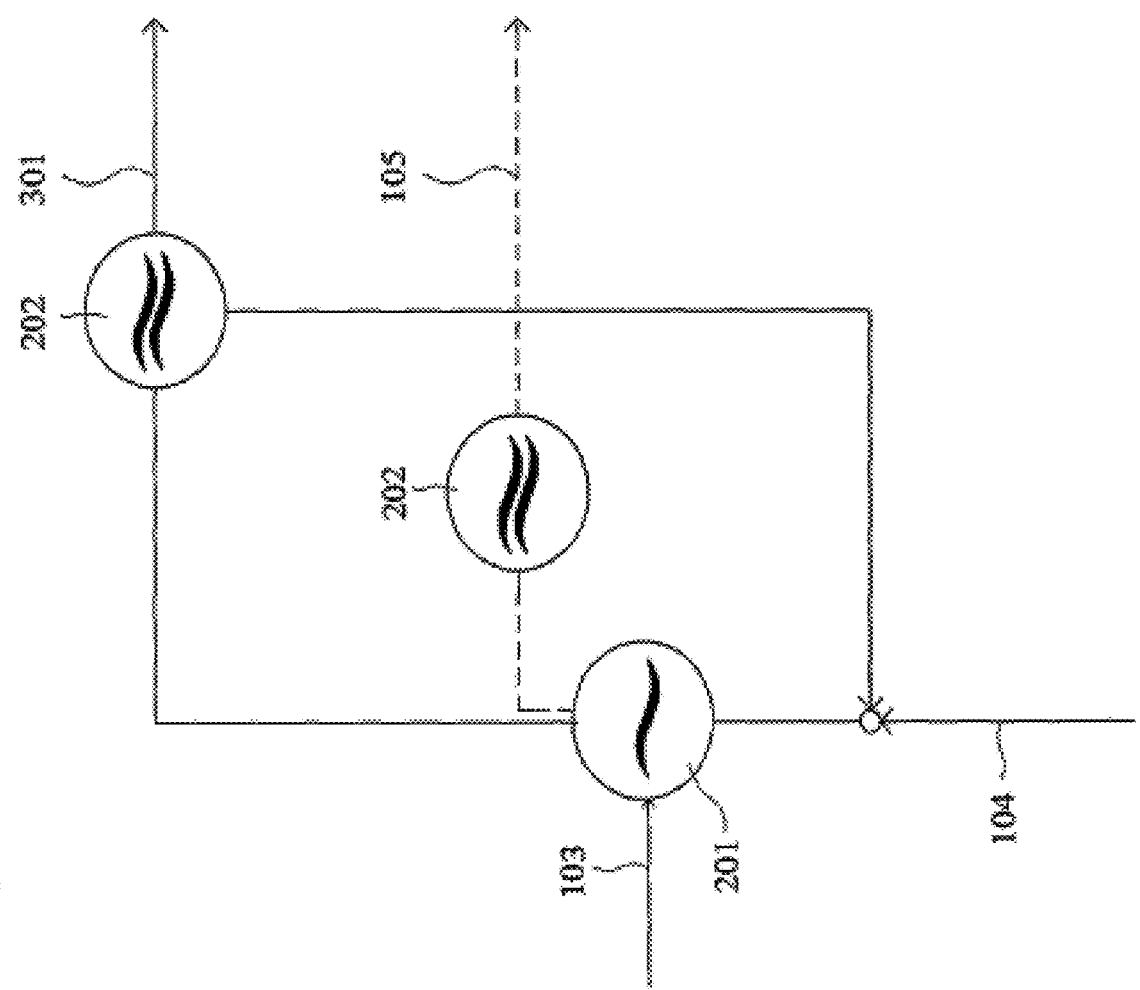
FIG. 3 is the ideal feedback $TPH_m$ control system of active group.

FIG. 3 is the ideal feedback $TPH_m$ control system of active group. $TPH_m$ produced by the combustion dynamic system reaches the highest level 301 and is promoted by thermo dynamic system feedback to flow of air and elevates level of $TPH_a$ participating combustion dynamic system. The dotted line in FIG. 3 shows the active group without feedback $TPH_m$ control. The level of $TPH_m$ 105 is much lower than 301.

The level of thermo potential heat flow $TPH_m$ 105 produced by combustion processes 201 of engine depends on the intensity of combustion, or rate of release of hidden heat energy, not on the fullness of releasing the hidden heat energy of fuel. Feedback $TPH_m$ 105 to the combustion process is to intensify the combustion processes, increasing the rate of releasing the hidden heat energy thereby elevates the level of $TPH_m$ 105. Two methods are developed as foundation for the design and construction of the OFHE internal combustion engine.

The First Method

The first method provides $TPH_m^{max}$ as follows:

The maximum thermo potential heat energy flow 301, $TPH_m^{max}$, is produced in combustion dynamic system 201 only when feedback $TPH_m$ 105 by thermo dynamic system 202 to combustion dynamic system 201 is without loss of $TPH_m$ 105.

The method can be explained as follows:

Feedback $TPH_m$ 105 by thermo dynamic system will intensify the combustion processes up to the limit of intensity of combustion for the specific fuel participating the combustion. Any further increasing the intensity of combustion is impossible by thermo dynamic system to feedback $TPH_m$ 105 to combustion dynamic system. This is the states of combustion dynamic system 201 to produce $TPH_m^{max}$ 301.

On the other hand, the thermo dynamic system 202 cannot carry $TPH_m$ 105 greater than that produced by combustion dynamic system and feedback $TPH_m$ 105 to the combustion dynamic system 201. Both dynamic systems 201 and 202 can maintain on $TPH_m^{max}$ 301 only when feedback $TPH_m$ 105 by thermo dynamic system 202 to combustion dynamic system 201 is without loss of $TPH_m$ 105 as stated by the method.

The method can also be verified by testing.

The method of provides $TPH_m^{max}$ 301 is important in the development of OFHE internal combustion engines in following aspects:

1) The method implies that with right fuel/air ratio, $TPH_m^{max}$ produced by combustion dynamic system depends on the fuel used in the OFHE internal combustion engine. For any specific fuel used for the OFHE engine, $TPH_m^{max}$ can be determined by testing in laboratory monitoring the working processes of active group.

2) The method provides a rational criterion for thermo efficiency of internal combustion engines as $$\eta = \frac{\text{Power output of engine}}{TPH_m^{max}, 301}$$

This is the main guide for the design of the OFHE internal combustion engine.

So far the thermo-efficiency of internal combustion in text books is overestimated. The thermo-efficiency of conventional internal combustion engines according to the rational criterion is extremely low.

3) The method pointed out that the intervention of moving mechanical mechanisms in the working processes of conventional internal combustion engines is the main cause of lower the thermo efficiency of conventional internal combustion engines:

a) the feedback $TPH_m$ to combustion dynamic system is degraded twice: The $TPH_m$ first changes into mechanical power and mechanical power changes into $TPH_m$ again and feedback to combustion dynamic system;

b) the combustion dynamic system is working always under devalued $TPH_m$ which has been produced by combustion dynamic system;

c) the intervention of moving mechanical mechanisms of conventional internal combustion engines in the working processes makes the engine to produce much less $TPH_m^{max}$ of the specific fuel.

These defects of conventional internal combustion engines cannot be rectified within the frame of conventional internal combustion engine.

Standard text books about internal combustion engines are the exposition of conventional internal combustion engines. It includes no idea of $TPH_m^{max}$. The inventors of internal conventional engines a century ago probably were unaware the necessity of feedback control $TPH_m$, in the engine working processes. Yet the inventors had unconsciously involved mechanical mechanism in their engines to provide feedback $TPH_m$ processes. However, the moving mechanical mechanisms intervening the feedback processes of $TPH_m$ are against the method of provides $TPH_m^{max}$ stated above. It consume $TPH_m$ produced by combustion, and suppress the combustion processes to produce $TPH_m$ to its maximum extent. This is the origin of serious drawback of conventional internal combustion engines. Further discussion of the defects of conventional engines are discussed herein.

In practice, there are some losses of $TPH_m$, in the feedback $TPH_m$ control cycles of the OFHE internal combustion engine. The feedback $TPH_m$ control system of the OFHE internal combustion engine ensures the optimal $TPH_m$ in all internal combustion engines. The method of optimum of feedback $TPH_m$ control system of the OFHE internal combustion engine and technologies implementing the method are discussed below.

The Second Method

Feedback $TPH_m$ control system of active group and the optimal feedback $TPH_m$ of active group.

One of the most important contributions of the OFHE internal combustion engine is the development of the method of optimal feedback $TPH_m$ control system of the active group and its implementation with the contemporary technologies.

General automatic feedback control systems are controlling the parametric objective of dynamic system beyond the energy sources of the systems. The tasks of feedback control of the OFHE internal combustion engine are to control the energy source of combustion dynamic system as well as the parameters of thermo dynamic system of the OFHE internal combustion engine.

The Second Method:

Feedback $TPH_m$ control system of the active group 101 is optimized by demodulation $TPH_m$ from media, products of combustion, and modulated TPH on the fresh air participating the combustion dynamic system. The optimum feedback $TPH_m$ processes elevate the level of $TPH_m$ produced by combustion dynamic system approaching $TPH_m^{max}$. The feedback $TPH_m$ processes are of self-sufficiency, it needs no assistance of foreign moving mechanical mechanisms 801 of FIG. 7A, nor the assistance of foreign moving mechanical mechanisms of rotor and shaft of jet engine for aircraft, 807 of FIG. 7B.

The demodulation from media and modulated TPH on fresh air are carried out by conducting shock wave between media and fresh air participating the combustion dynamic system.

Figure 5A:
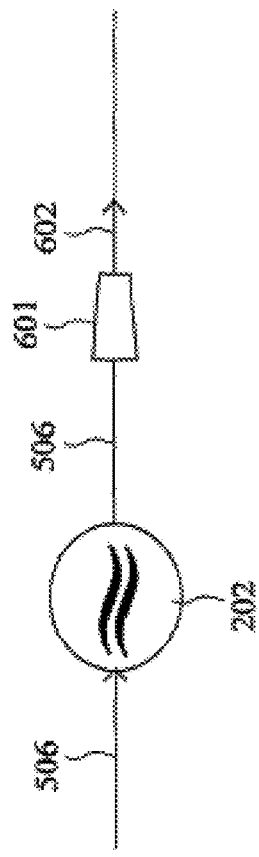
FIG. 5A and FIG. 5B are schematic representation of the working process of passive group 102 of the OFHE internal combustion engine.

Three options are provided for the power out for the passive group:

The first option is the jet power output 602 as shown in FIG. 5A. The $TPH_m$ 506 produced by combustion dynamic system 201 in active group 101 is conducted into a jet construction 601 through thermo dynamic system 202 and forms the jet power output 602. The three parameters of jet power output: temperature t, pressure p, and velocity v, are under control of feedback $TPH_m$ control system of active group.

Figure 5B:
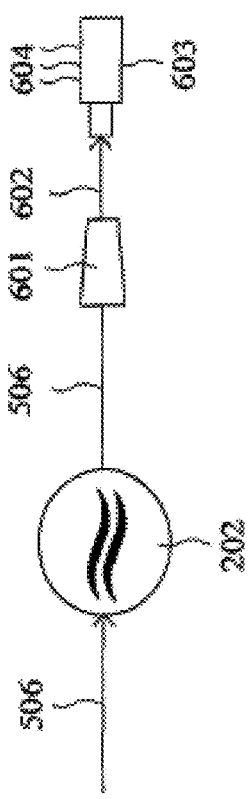

The second option is shown in FIG. 5B, the jet power output 602, is adopted by the turbo-generator 603 to send out electricity 604 as power output.

The third option is the hybrid of both jet power output and electrical power output.

The working processes of the OFHE internal combustion engine assembly are the syntheses of the working processes of the active group and the passive group of the engine assembly which have been analyzed above. The properties of the engine assembly are the combination of the properties of the two groups.

Figure 6B:
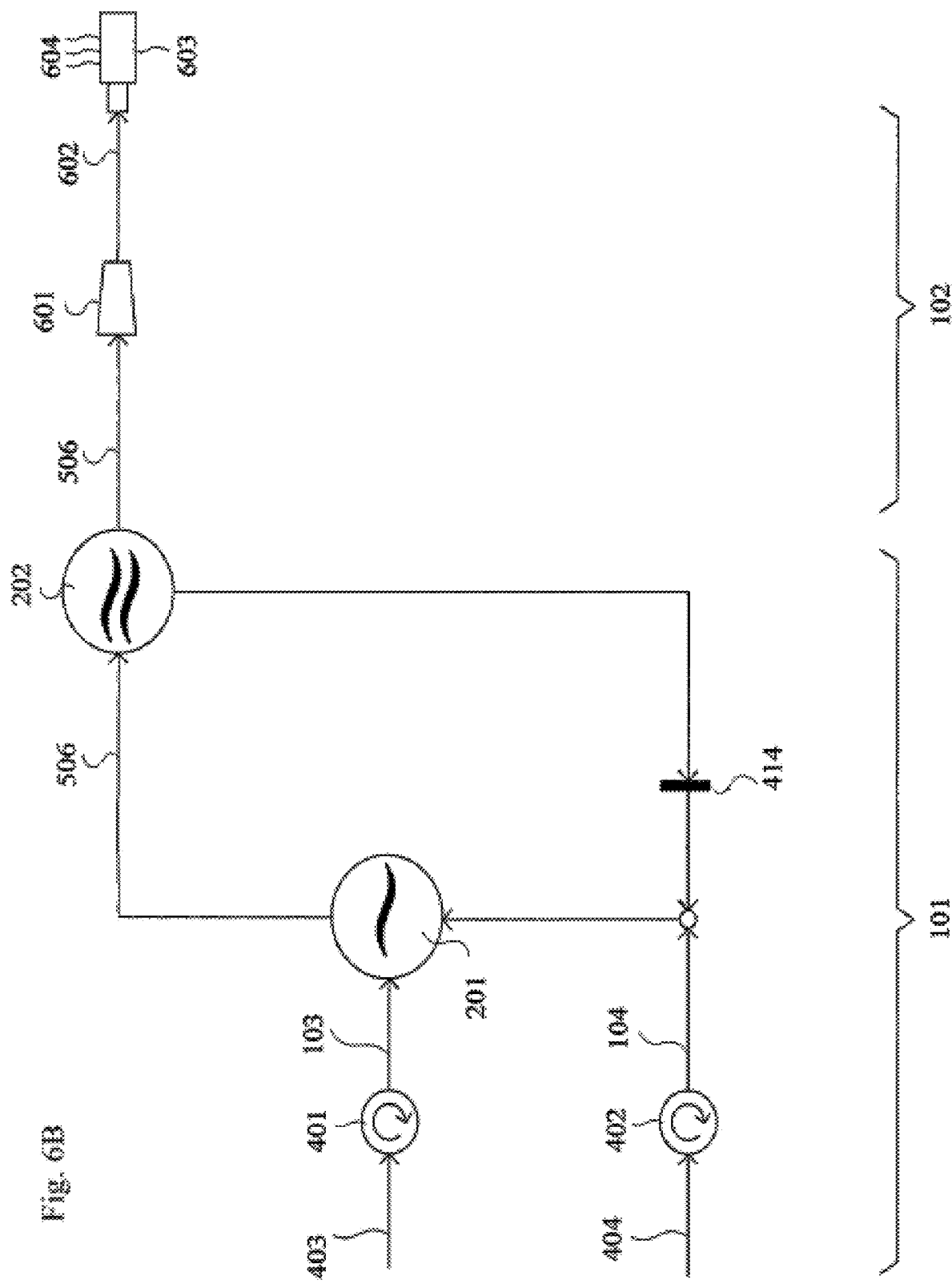

FIG. 6A and FIG. 6B are schematic representation of working processes of the OFHE internal combustion engine assembly. The flow of fuel 103 and flow of air 104 are conducted to the active group 101 by independent power driver 401 and 402 respectively from fuel source 403 and air source 404. The combustion dynamic system of active group 201 produces $TPH_m$ 506 which is carried out by thermo dynamic system 202 to the passive group 102. Part of $TPH_m$ 506 of thermo dynamic system 202 is feedback to combustion dynamic system. The passive group is a jet construction 601. The power output of passive group has three options: One option is the jet power output 602 in FIG. 7A. The other option is electrical power output 604, where the turbo generator 603 is adapted to the jet 602 in FIG. 7B. The third option is hybrid of both jet power output and electrical power output. Particular feature of the OFHE internal combustion engine assembly are:

1) The OFHE internal combustion engine assembly has no mechanical connections between its active group and passive group; each group has its distinctive working processes.

2) The OFHE internal combustion engine is distinguished by its optimal feedback TPH, control system processes in the active group. The processes are completed by its own energy.

3) The overall thermo efficiency of the OFHE internal combustion engine is optimal based on the method of optimal feedback $TPH_m$ control system of the active group.

4) Independent power drivers to supply fuel and air to the engine proper.

Defects of the Conventional Internal Combustion Engines.

The nature of the active group and two methods developed herein are applicable to all internal combustion engines. The conventional internal combustion engines assembly can also be divided into the active group and the passive group. The working processes of the conventional internal combustion can be analyzed in FIG. 7A and FIG. 7B.

Defects of the conventional internal combustion engines are clear:

1) FIG. 7A shows the sketch of working processes of reciprocating cycle conventional engines, i.e. the Otto cycle and Diesel cycle engines. The engines have the moving mechanisms of pistons and crankshafts showing in FIG. 7A as 801. In order to show the change in the form of flow of power, the piston cylinder and crankshaft mechanisms are presented in double form. It is to be noted that after $TPH_m$ 505 entering the moving mechanisms 801, the heat energy flow $TPH_m$ 505 is changing into mechanical power 802. This is so called power stroke. And the mechanical power 802 is entering the same moving mechanical mechanisms 801 again and changing into heat power flow 803, and feedback to the combustion dynamic system 201. This is so called compression stroke. The feedback $TPH_m$ 505 in conventional internal combustion engines is devalued twice, the power output is 806.

The working processes of jet engines for aircrafts are the same as that of conventional reciprocating engines. It is shown in the FIG. 7B similar to FIG. 7A. The moving mechanical mechanisms intervening the working processes are rotor and shaft 807, and the power output is the jet power 808. The feedback $TPH_m$ 505 is similarly devalued twice. In both reciprocating engines and jet engines, the active group of power production and the passive group of power output are rigidly bound up by moving mechanical mechanisms shown by dotted lines 809.

2) The clumsy moving mechanical mechanisms 801, FIG. 7A or 807, FIG. 7B extend to the whole engine from fuel and air intake driving to the output power driving shown by dotted lines 809. $TPH_m$ in the long range transmission will be lost, thereby the level of $TPH_m$ that could be used as power output is reduced.

3) The fuel and air intake driving mechanism and output power driving mechanism are all shared with the same piston and crankshaft or rotor and shaft. The power production part and all power consumer parts are bound together as shown by the dotted lines 809. It greatly limited the design of transportation devices and its performances.

4) In the manufactory of the conventional internal combustion engines the mechanical works are mostly the said piston and crankshaft or rotor and shaft moving mechanical mechanisms of the engines. Maintenance works of the transportation devices are also the same mechanisms. All the costs are much greater than the counter works of the OFHE internal combustion engine.

Figure 8:
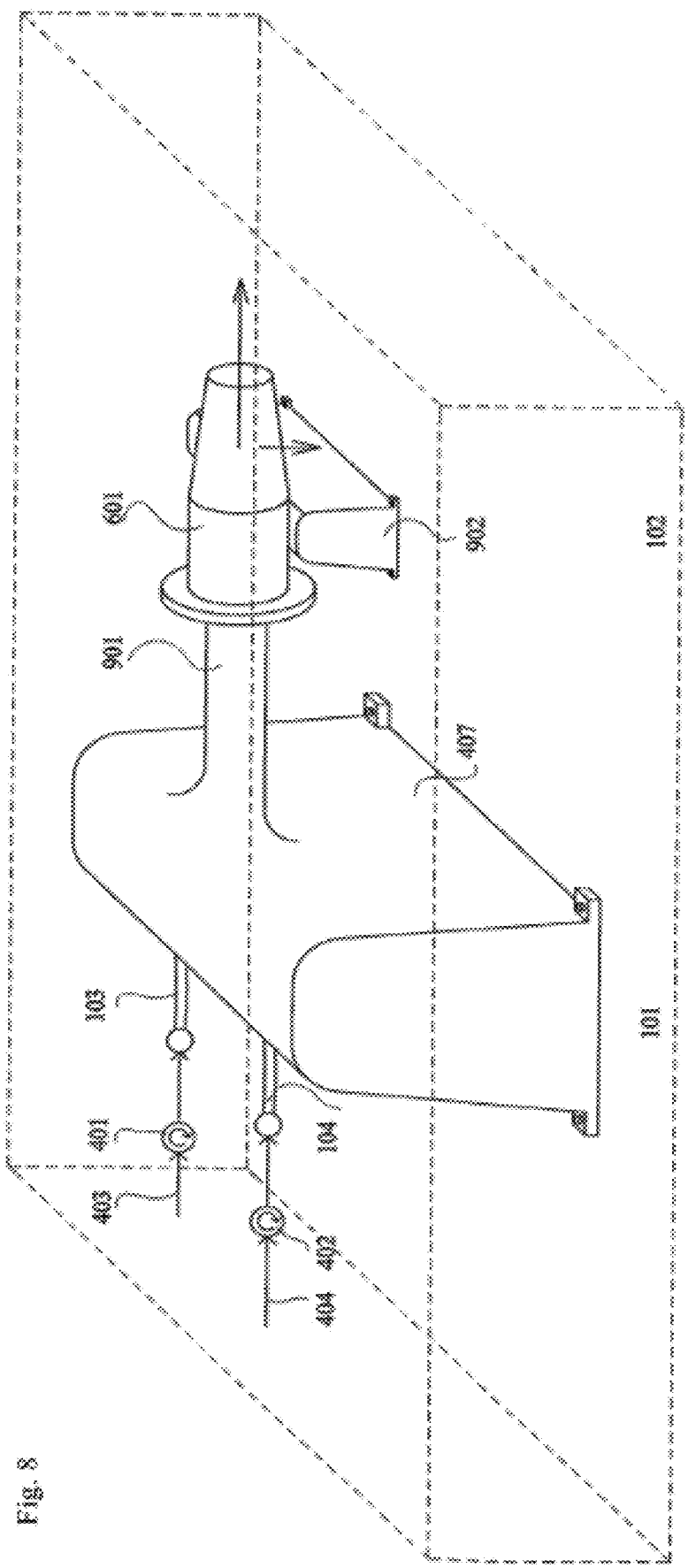
FIG. 8 is schematic representation of general layout of the OFHE internal combustion engine assembly in the transportation devices.

FIG. 8 is schematic representation of the OFHE internal combustion engine assembly in the transportation devices. The independent fuel 103 supply tubes and independent air supply tube 104 are the input of the stationary stand of active group 407. The duct 901 on media is the output of the stationary stand of active group 407 which is mounted on the transportation devices on favorable position.

Jet power output 601 is mounted on a vertically rotating mechanism and the latter is mounted on the stationary stand of passive group 902. The stationary stand of passive group is mounted on favorable position of the transportation devices separately from the stationary stand of active group.

The vertically rotating mechanism bearing with the power output jet 601 are operated in coordinating with parts of the transportation devices (such as changing and folding wings of aircraft) by power operated linkage to control the posture of the transportation devices (such as landing and take-off operation of aircrafts).

The coordination of posture of transportation device and direction of jet power output are controlled by computer.

The stationary stand of active group and stationary stand of passive group are connected by the duct of shock tube on the media. There are no moving mechanical mechanisms or other rigid material in the duct. Both stationary stands can be fixed on the transportation devices independently.

FIG. 8 is the general layout of OFHE internal combustion engine assembly. Detailed design of stationary stand of active group 407, stationary stand of passive group 902, the vertically moving mechanisms of jet power output and linkages with posture of transportation devices are all general mechanical design work.

The design and construction of the active group are the realization of the optimal feedback control system. The fundamental differences between the OFHE internal combustion engine and the conventional internal combustion engines are that the OFHE internal combustion engine depends on the operation of system of valves and synchronizers to control the feedback $TPH_m$ control system, while the conventional internal combustion engines use moving mechanical mechanisms to do the feedback $TPH_m$. The defects of conventional engines have been analyzed previously herein.

The operation of feedback $TPH_m$ control system are valves, synchronizers and shock tube which may be relocated in detail design. The operation of valves and synchronizer and its peripherals may be mechanical, electrical or fluidic system and devices.

As stated above, all the valves and synchronizer are coordinated and controlled by computer to ensure the shock wave occurs at shock tube to transmit $TPH_m$ from media to air and participating combustion processes.

Applications of New Engine.

1) The essential features of the OFHE internal combustion engine are
   It has no piston and crankshaft as that of Otto and Diesel cycles;
- No rotor and shaft as that of jet engine for aircraft.
- It has overall thermo-efficiency much high than the conventional internal combustion engines.
- It has weight/power output ratio much less than the conventional internal combustion engines.
- The OFHE internal combustion engine assembly has two groups: the active group which produces power, and the passive group which provides power output. Within the two groups there is no rigid mechanical connection. It give the designer of transportation devices to locate the power production group and power output group in favorable position separately.

2) Transportation devices powered by the OFHE internal combustion engine will be renovated transportation facilities with better performances, safety and conveniences.

3) The aircraft powered by the new engine will have changing and folding wings, thereby the landing and take-off of aircraft can be operated without long running way. The speed of flight in sky can be much high than the present aircraft. It is impossible for the aircraft powered by the conventional internal combustion engines.

4) The cars powered by the OFHE internal combustion engine can be carried with a small folding wing and lifted and served as amphibian car. It is impossible for the present car to do the same task.

5) The locomotive of the railway power by the OFHE internal combustion engine will have much higher speed than the present train speed. And the air floating train can be design to replace the magnetic floating train currently operated. The air floating train is safer than the magnetic floating train. It is impossible for the train powered by the conventional internal combustion engine to do the same.

6) The marine vessels powered by the OFHE internal combustion engine will be maneuvered at much better performances.

7) In order to fully develop the capability of distinguish performances of transportation devices powered by the new generation engine than that of transportation devices powered by the conventional internal combustion engines, correspondent facilities should be provided to accommodate the transportation devices powered by the OFHE internal combustion engine. The infrastructure of airport, railway and railway station, the car traffic and wharf should be renovated.

8) The construction of OFHE internal combustion engine are simple, reliable, and low in weight/power output rate. Manufacture industries related with engine and transportation devices will be set in track of sustainable development.

9) The OFHE internal combustion engine and transportation devices powered by the OFHE internal combustion engine emit less carbon dioxide and other exhaust gas than similar power of conventional internal combustion engines. Therefore it meets the green car requirements.

10) The OFHE internal combustion engine will initiate new generation transportation devices and related manufacture industries.

The described shock wave system may be applied in civil and/or military industrial systems, for example, the described shock wave system may be implanted in: automobiles, the air floating railway, the air flow bus without wing and aircraft.

Methods for Producing an OFHE Engine Automobile

The working processes of the OFHE engine involve two distinctive groups: the active group and passive group. As discussed herein, the active group produces power output for movement of moving body (e.g., the described transportation vehicles, including automobiles). The passive group is configured to change the power output of active group to one or more other forms of power to control the movement of the moving bodies (e.g., automobiles).

Discussed herein is a development of the fundamental theories of a next generation internal combustion engine (e.g., an OFHE engine). Such developments include, for example:

1) Every internal combustion engine has energy feedback to produce applicable power output.

2) Only heat energy feedback can produce high thermo efficiency. In contrast, conventional engines including Diesel engine, Otto engine, and jet engine for aircraft provide only mechanical work feedback, and accordingly have low thermos-efficiency.

3) As discussed herein heat energy feedback may be achieved by shock wave.

4) The part of feedback heat energy of the OFHE engine achieve the above three fundamental theories of internal combustion engine. Moreover, various methods for optimizing the engine are discussed above.

With support of the above fundamental theories of internal combustion, OFHE engine is the next generation engine. It may change transportation devices of both civil and/or military vehicles.

From the title OFHE engine, it will be indicated that feedback heat energy (FHE) may be achieved by shock wave to feedback heat energy of media to air. Several of the discussed methodologies use shock tube to achieve the above said processes. Shock tube is a general device used in labs. It ensures the realization of FHE of OFHE engine.

Optimization of OFHE engine is provided by taking ½ of an amount of fuel to be drawn into engine to produce high temperature air (modulated air) to be combined through combustion with the remaining ½ of the amount of the fuel in combustion chamber. The high media flow power output of OFHE engine (the power output at the opening of combustion chamber) approaches its maximum ($TPH_m$ approaches $TPH_m^{max}$).

Active group of OFHE engine is a system of flow of fluid. There are four mechanical parts to guide the flow of fluid. The four mechanical parts are as follows:

A) The Four-Bar-Linkage

The four-bar-linkage is a common mechanical part to magnify the direction and movement of two points as schematically in FIG. 9A. The big horizontal movement of end A is reduced to the small vertical movement of parts B which can be operated by a small-motor and the motor is controlled by real time computer control program.

B) The Check Valve

A check valve, as illustrated in FIG. 9B, may have a thickness of around 2 cm depending on the flow passing the valve. There are flanges to pass the inflow the outflow which is reduced to tube joining with adjacent tubes. The check valve is symbolized by X, normally closed. There is a blade in the valve. It has a stem which is connected with four-bar-linkage. The small movement end is operated by a small motor which is controlled by real time computer program.

C) Cylinder and Piston Shape Pump (for Media and Air)

Figure 9A:
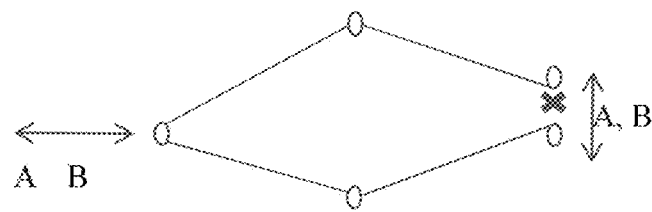
FIG. 9A is a schematic diagram of the four-bar-linkage
Figure 9B:
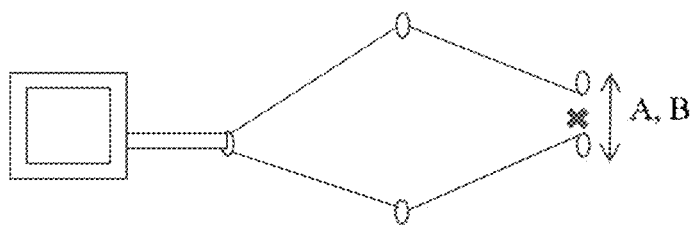
FIG. 9B is a schematic diagram of the check valve
Figure 9C:
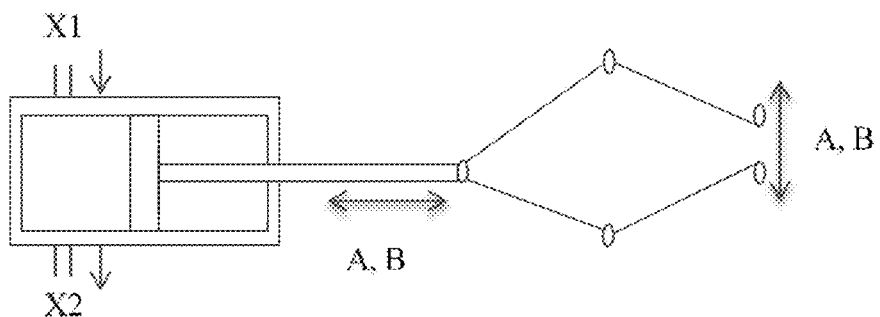
FIG. 9C is a schematic diagram of the Cylinder and piston shape pump (for media and air)

In the illustrated embodiment of FIG. 9C, the cylinder has a volume of about 3 litres. The piston and piston rod are snug fit with the cylinder body. The piston rod is connected with a four-bar-linkage as described above. As discussed above, the small movement end is operated by a small motor, which is controlled by real time computer program.

Normally the cylinder is in fully open condition M2. Then cylinder moves from the open condition to a vacuum state. Where valve X1 is open, the flow is sucked into the cylinder. Then valve is closed. Then piston is compressed to ⅓ volume of cylinder in state M1. The pressure of the fluid is 3 atmospheres. It is to be seen that after 3 stages of successive compressive compression, the final pressure becomes 81 atmospheres, but the final compressed volume is still 1 litre.

D) Shock Tube

Figure 4:
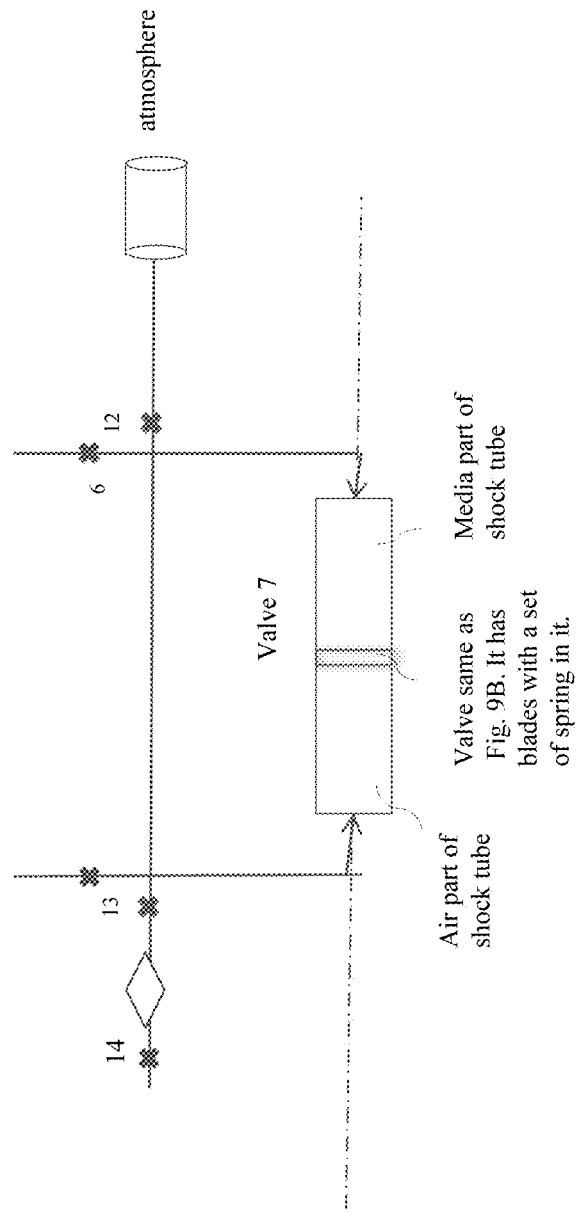
FIG. 4 is a schematic representation of a shock tube according to various embodiments.

Returning now to the illustrated embodiment of FIG. 4, a shock tube may generally have two parts, media part and air part. Both parts have a volume of about 1 litre, and cross sectional area of approximately 9 cm$^2$. There is a valve with two blades having set of spring between it to balance the pressure between media and air. When valve 7 opens, the higher heat energy contained media and lower heat energy contained air meet exactly at the middle point of shock tube. After the energy of media is provided as feedback to the air, valve 7 is closed. The demodulated media is exited to atmosphere through valve 12 with a shock absorber. And the modulated air is exited to a buffer (having a volume of about 1 litre) with valve 14, ready to inject into combustion chamber.

Figure 16:
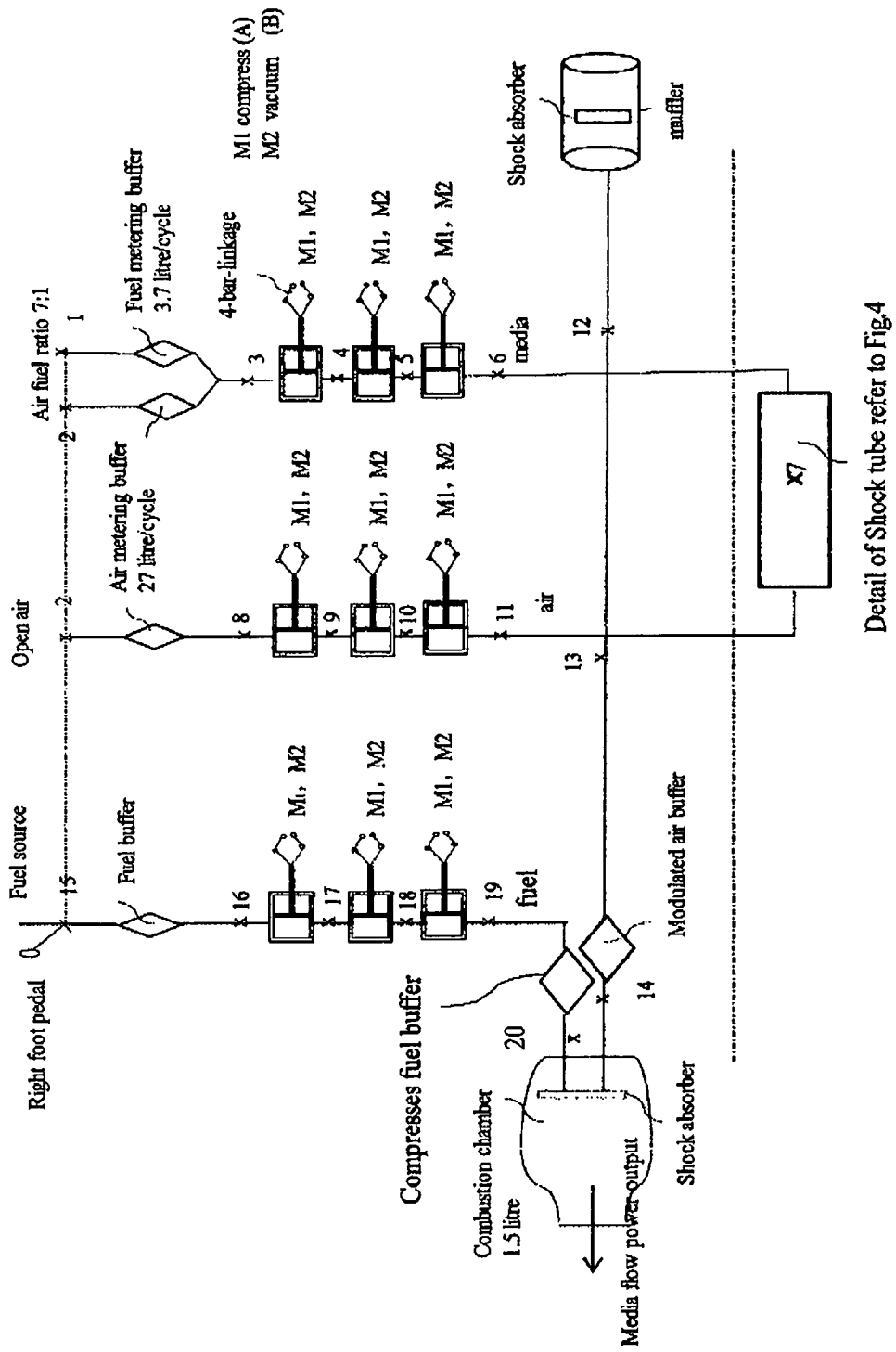
FIG. 16 shows the general layout of an OFHE engine active group according to various embodiments.

For further context, FIG. 16 shows the general layout of an OFHE engine active group. As shown in FIG. 16 there are three columns of series of pumps. The first column of pumps starts from valve 3 for media. The second column of pumps starts from valve 8 for air. And the third column of pumps starts from valve 16 for fuel. The first pump of each column is in state M2, i.e. in vacuum condition. Therefore the fuel and air mixture is sucked into the first pump of first column of the pump. After three times of compression, the fuel and air mixture sucked in the first pump are combined to become media on the third pump in state M1. After the fuel and air are mixed, the media has a pressure of about 81 atmospheres, and a volume of about 1 litre.

Similarly, the air in the third pump while the third pump is in state M1 has a pressure of about 81 atmospheres and volume of about 1 litre. The fuel in the third pump while the third pump is in state M1 has a pressure of about 81 atmospheres and volume of about 1 litre.

When the valves 6 and 11 open at same time, the media and air fill the media part and air part of shock tube respectively. There is a pair of blades in valve 7. A set of springs between the blades are configured to equalize the pressures of the media and air at the valve 7. When the blades of valve 7 are lifted, the highly unbalanced heat energy between media and air generates a shock wave to feedback heat energy of media to air. The processes are just the feedback heat energy (FHE) of active group of OFHE engine.

The above said feedback heat energy (FHE) is carried out in very short time. After generation of the shockwave, the valve 7 is closed again.

After the valve 7 is closed, the valve 13 is open. The modulated air fills the buffer (which defines a valve 14), ready to inject the media into combustion chamber. On the other hand, when valve 12 is open, the demodulated media is exited to atmosphere through a muffler with a shock absorber in it.

The third column of pumps is starting from valve 16. The fuel Is sucked into the first pump of the column. After three stages of compression, the fuel has a pressure of about 81 atmospheres measured at valve 19. When the valve 19 of fast column of pump is "off" and "closed", the both buffers of modulated air and compressed fuel are filled. Valve 15 and 14 are open at the same time and the compressed fuel and modulated air are injected Into combustion chamber. It makes the compressed fuel and modulated air fully mixed and combusted (burned) in the combustion chamber. The media power output Is the optimal feedback heat energy (OFHE) of the active group of OFHE engine.

Then the valve 6 is opened and last pump of column of media returns to its original position, i.e. M2, sucking the residual media in shock tube, and valve 6 is closed again, Similarly, valve 11 open, and last pump of column of air returns to Its original position, i.e. M2, sucking the residual air in shock tube, and valve 11 is closed again. Finally, the valves 14, 15 and 19 closed again. The last pump of the third column returns to its original position, I.e. M2 state.

All groups of pumps and valves are returned to its original position and are ready for the next cycle of operation.

The real time computer control program may be organized in a time saving program. It will produce power output at the opening of combustion chamber within few seconds. Also, the real time computer program is designed to start from first step, after the car is stopped and restarted, the working processes of active group of OHFE engine are completed.

It is to be noted that:

1) The fuel and air conducting to the above OFHE engine automobile for each cycle are assumed to produce 160 HP. Car manufacture factory should change the fuel and air mixture metering buffer capacity and fuel metering capacity to suit the power requirement of their automobile.

2) There is no high inertia part for the OFHE engine. Therefore no starter motor similar to those used in conventional engines is needed. The real time computer control program will provide high media flow power output at the opening of combustion chamber within few seconds.

Figure 18:
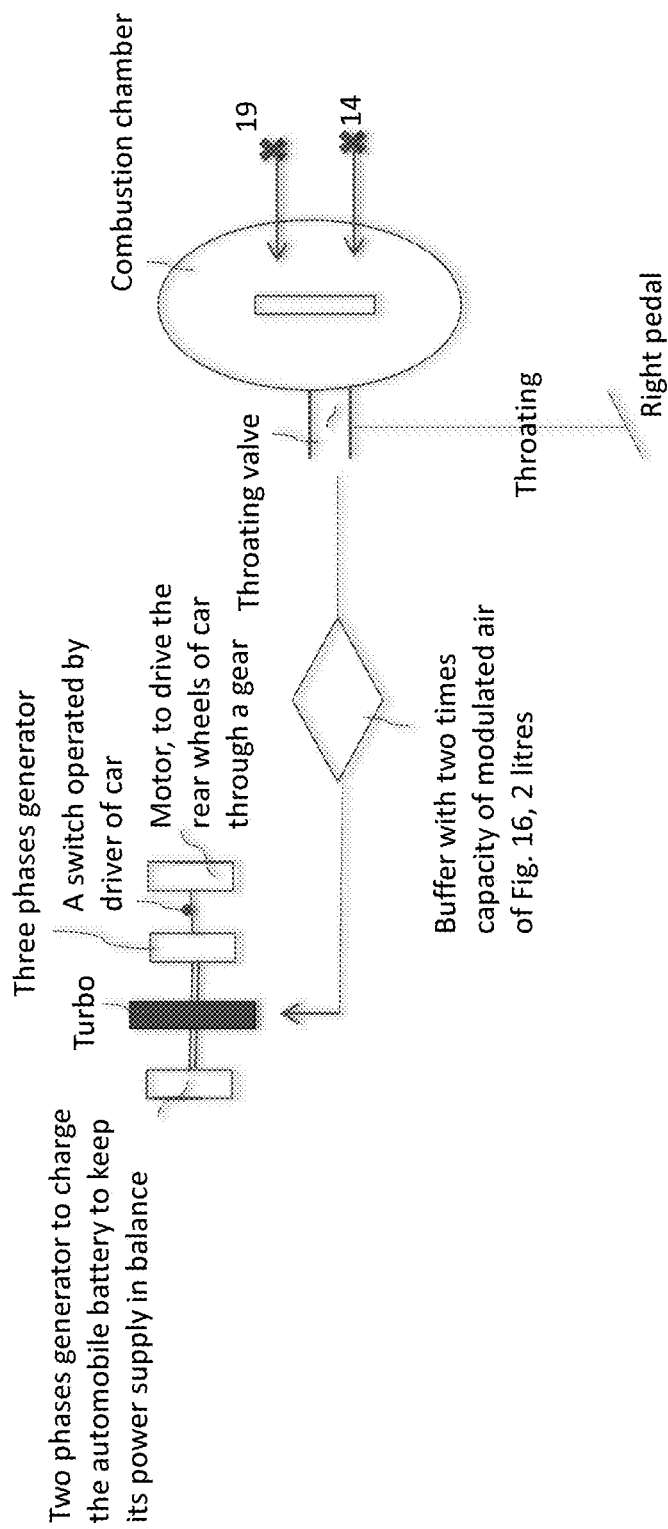
FIG. 18 shows an exemplary configuration of the passive group of OFHE engine automobile configured to change the power produced in active group into another form of power to control the automobile.

In various embodiments, there are two generators on the shaft of a turbo, the three phase generator to supply power for a motor which drives the rear wheels of car through a gear. Between the generator and motor there is a switch to control the working of the motor. The switch is controlled by driver of car as shown in FIG. 18.

Operation of the Passive Group

Figure 17:
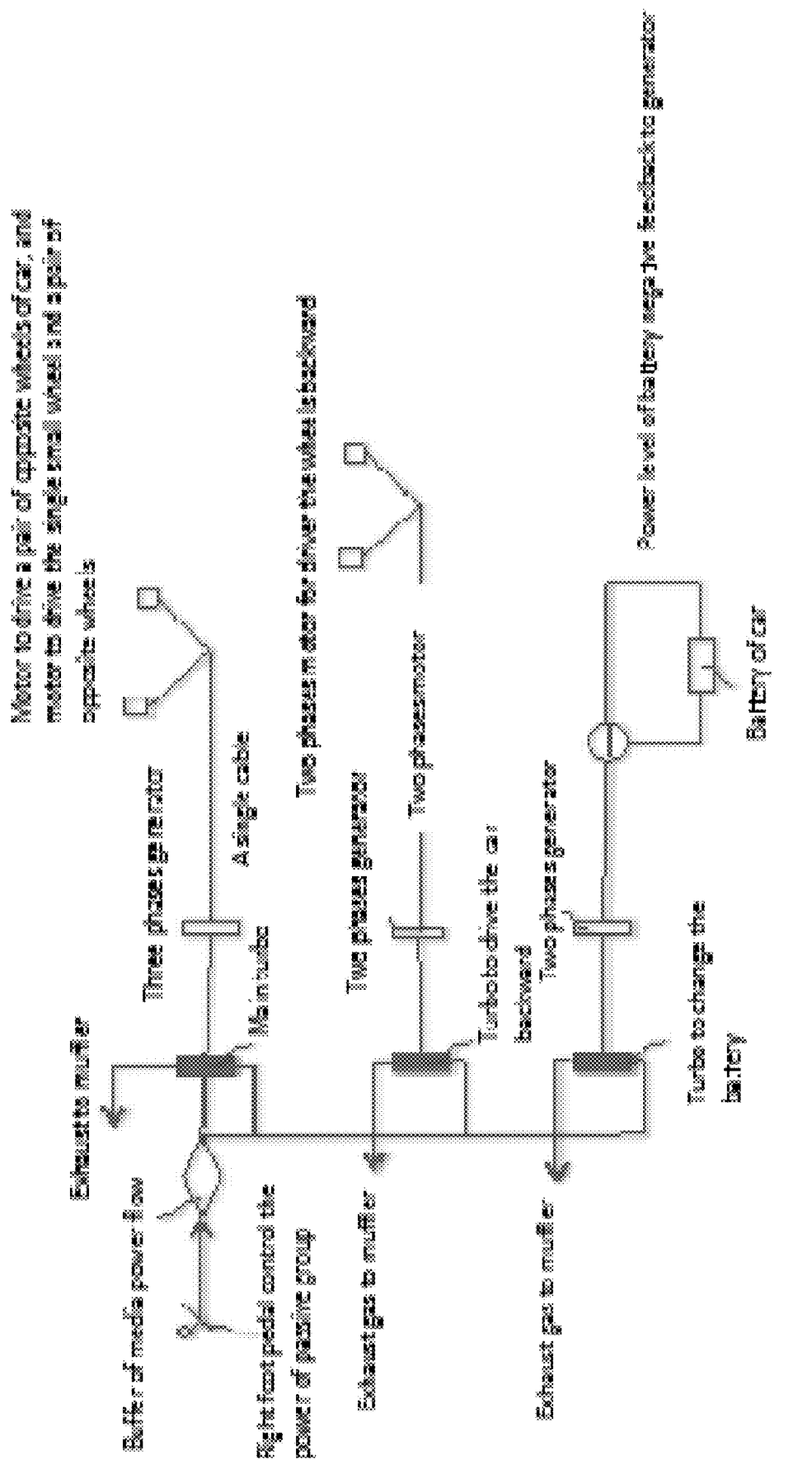
FIG. 17 shows the passive group of OFHE car to drive the wheels of car and to charge a battery of a car according to various embodiments.

In the illustrated embodiment of FIG. 17, there are three independent turbo in the passive group which draw the media power flow in buffer between the active group and passive group and changes it into another form of power (e.g., electrical power).

As shown in FIG. 17, the first turbo is the main turbo. When the driver of a vehicle pushes a left hand control rod forward, the media power flow is directed from the buffer to drive the main turbo and generator set. In various embodiments, the generator has cables to drive the motors the steering wheel of car. One cable drives the single motor of wheel of steering wheel. Only cable to drive the pair motors of wheels of the steering wheel. Since the cable has limited electricity energy, therefore in turning of direction, motor of wheel takes more power for the fast wheel (e.g., the wheel on the outside of a turn) than the motor of the slow running wheel (e.g., the wheel on the inside of a turn). Thereby the pair of two wheels each turn at a different speed, such that the vehicle turns. In various embodiments, the steering wheels of a vehicle have a smaller diameter than the main wheels of car for easier to drive it. Moreover, the three steering wheels are driven by motors, which each motor serves as assistant power of an associated steering wheel. One cable is to drive a pair the two opposite big wheel motors as the small pair of steering wheel, motor, the big two opposite wheels turn at different rates.

In various embodiments, there is a switch in the generator. The switch being "off" or "on" are controlled by a right hand control rod, when a user pushes the rod forward, the switch is "off", and when the user pulls the rod backward, the switch is "on". The user may provide the above action to follow a traffic signal light. Therefore the car is running or stopping quickly, while the engine is always in running condition to supply power of the car.

A second turbo is configured to drive the car backward. When the left hand controlled rod is pulled backward, the first turbo is stopped. The second turbo is driven in opposite direction of the first turbo. In various embodiments, the second turbo drives a two-phase generator in a reverse direction (opposite the direction of the first main turbo). The generator drives the reversed driving motor of wheels, so that the car is driven backward. When the driver of the car determines that the car is driven backward enough, the driver pushes the left hand control rod forward. After the second turbo is turned off, the first turbo drives again. The control rod of right hand may then be operated to follow the traffic light again.

A third turbo may be configured to always direct the media power flow from the buffer. In various embodiments, the third turbo turns in same directions as that of first turbo. The third turbo drives a two phase generator, which is configured to charge the car battery. The level of power of battery is provided as negative feedback to the generator to keep the level of power supplying constant. The car battery supplies the power for the real time control computer program of the active group, the car signal lights, and/or other electrical systems of the car.

Driving the OFHE Engine Car

Driving the OFHE engine car is much easier than driving a car having a Diesel or Otto engine.

In various embodiments, there is a notched plate near the steering wheel configured such that, when the traffic signal is "green", the right hand control rod may be positioned on one notch. This leaves both hands of the driver to control the steering wheel. As described above, each of the steering wheels have associated power assistant motors. Accordingly, only a light touch of the steering wheel is necessary to control the steering wheel. When the traffic light is "red" the driver of the vehicle places the right hand control rod on other notch, waiting for the change of traffic light.

Providing the OFHE Engine in a Car

All material parts of active group and passive group are fixed on car, the cables to drive the wheels of car are fixed on the bottom of car. Because of the configuration of the OFHE engine as described above, a car utilizing an OFHE engine may maintain the aesthetic appearance of a conventional car. Accordingly, all the car manufacture can replace their conventional engine technology with the modern technology OFHE engine while maintaining the general look and feel of their current vehicles.

The following is to make the above statement more clear:

1) In various embodiments, the right pedal of a vehicle does not to control the power output at opening of combustion chamber, but is instead configured to control the power output of the active group to match the power requirement of the passive group. The automobile factory engineers may adjust the fuel-air mixture admitted to column of media (as shown in FIG. 16) and the flow of fuel through the column in order to make the flow power out of combustion chamber to equal the power requirement of the specific automobile.

2) The active group and passive group of the OFHE engine are relative independent.

3) In order to ensure the active group and the passive group of the OFHE engine remain relatively independent, there is a buffer with capacity at least two times as modulated air of FIG. 16.

With the described buffer, the active group is permitted to send media power flow to the buffer at any time and at any speed, and the passive group is permitted to pick up power flow from the buffer at any time and at any speed.

This same principle of construction of automobiles may similarly be applied for high power demanded by trucks and buses.

All OFHE internal combustion engines utilized in transportation devices, including automobile, aircraft, air floating railway transportation device, and marine vessels transportation devices, are divided in two groups: the active group and passive group. The active group produces power output, the passive group changes the power output of active group into another form of power output. In various embodiments, the active group and passive group have equal power output but different in form. The active group is same in form for all OFHE engine transportation devices. The passive group may be different for different transportation devices. Intermediate between the active group and passive group there is a buffer of media power. In various embodiments, the buffer serves as the balance point of active group and passive group. Moreover, particularly for automobiles, the OFHE engine is much easier to build and drive than Diesel or Otto engine powered automobiles.

Real Time Computer Control Program of Active Group of OFHE Engine for Automobile.

1) As discussed above, all OFHE engines have two groups: the active group and passive group. The active group produces power of the engine, and the passive group is configured to change the power produced by active group into another form of power for the operation of the transportation devices.

2) The active group of all transportation devices may have the same real time computer control program. In various embodiments, the passive group of the OFHE engine automobile has no computer control.

In various embodiments, there are 2 basic electric-mechanical parts for the real time computer control program.

Both electro-mechanical parts may have a similar four-bar-linkage. One is for the operation of pistons and the other for operation valves. The small end of 4-bar-linkage is stationery operated by a small motor to provide for quick movement of the other end. The small motors configured to control the pistons are used to control movement of pistons which are configured to compress the volume of cylinder to ⅓ of an initial volume. The width to length ratio of cylinder is ¾. In various embodiments, the cylinders are normally in a vacuum condition.

The small-motors configured to control the valves are to control the opening and closing of valves. In various embodiments, the valves are normally in closed conditions.

Described herein is the state of operation of the real time computer control program. The first column and second column are to produce the high thermal potential of media flow of the first column in order to produce feedback to low thermo potential air by the shock tube at valve 7. The first pump of first column is compressed to ⅓ of its volume. In various embodiments, the pressure of the mixture of fuel and air is about 3 atmospheres. The mixture is then transferred to the second pump by valve 4, where similarly the pump compresses the mixture to about 9 atmospheres. Then the mixture is transferred to third pump, where the described mixture is compressed to media with high thermo potential of about 81 atmospheres (the last pump has a piston with a corresponding large pair of 4 bar linkage of ⅚ of the length of others.)

The second column of air is like the first column to compress the air to about 81 atmosphere with lower thermal potential, so that the last pumps of first column and last pump of second column make high thermo potential difference to produce heat energy feedback (FHE) by valve 7, when valves 12 and 13 open at same time. The demodulated media is discharged to the atmosphere by muffler with shock absorber. The modulated air (high temperature) is passing to the modulated air buffer. Then the valves 6 and 11 are opened and the last pump of first column and second column restore to vacuum condition, ready for the next cycle.

The last column of pumps is to make optimal of FHE of the first and second column of pumps, thereby to provide OFHE.

When the valve 19 of last column of pumps is "off" and "closed", the both buffers of modulated air and compressed fuel are filled. When valves 14 and 15 "open" at same time, the high pressure modulated air and the highly compressed fuel are directed against the shock absorber, the normal pressure modulated air and fuel are fully mixed and combusted in the combustion chamber. The high media power flow is stored in a buffer between active group and passive group, ready for the passive group to change the media flow power into another form of power by the passive group to drive the car or other transportation vehicles as described herein.

A Comparison of Functions of OFHE Engine and Diesel Engine:

Since the jet engine for aircraft is another form of Diesel engine, with it crankshaft straightened, a Diesel engine is a representative for all conventional engines.

Every internal combustion has two groups: the active group which produces power output, and the passive group which draws the power output of active group, and changes it into another form of power to operate the transportation device. If there is no passive group, it will not be operate as an internal combustion engine.

Figure 19:
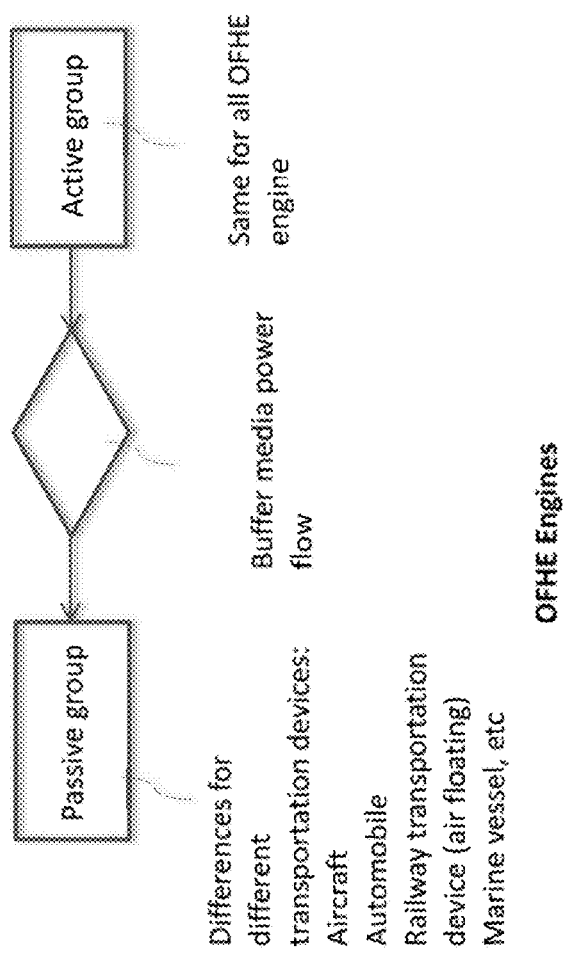
FIG. 19 shows an exemplary relationship between the active group of the OFHE engine and the passive group of the OFHE engine, with a buffer media power flow therebetween.

For an OFHE engine, the active group and passive group are separated, and interfaced with a buffer for media power flow. Power flow produced by active group put into the buffer, and passive group draws its power flow from the same buffer. The arrangements are shown in FIG. 19.

For Diesel engine, its active group and passive group are bounded together by a set of pistons, connecting rods, and a corresponding crankshaft.

Every internal combustion engine has some kind of feedback working processes, otherwise it cannot produce power output.

For an OFHE engine, the working processes of feedback is provided by the shock tube. Since active group is same for all OFHE engines, it may be the same shock tube for all transportation devices powered by OFHE engines. The media energy produced by fuel air mixture at valve 3, feedback to air from valve 7 with shock tube, the processes of feedback are detailed in the section of the "Building OFHE engine automobile". The feedback processes consume no heat energy of media. Shock tubes have long been used in labs for advanced experiments. The shock tube is simple in structure and stationary. The shock tube ensures the reliable working processes of active group of OFHE engine, and thereby the transportation devices powered by OFHE engine are perfect and satisfactory machines.

For Diesel engines, the above said feedback processes is provided by the above said piston, connecting rod, and crankshaft system. The heat energy produces by the combustion chamber of Diesel engine is produced by a power stroke which is then changed into a mechanical work. The mechanical work then changes into heat energy again during a compression stroke, then feedback heat energy to the original combustion chamber. In the processes, the heat energy of media is discounted at least two times.

The working processes of feedback with a shock tube are referred to herein as feedback heat energy (FHE). The working processes of feedback of Diesel engine are provided by the above said piston connecting rod and crankshaft. We call the latter mechanical work feedback. Up to now, all conventional engines are characterized by mechanical work feedback. Heat energy feedback (FEH) is an important invention of OFHE engine.

According to the above brief comparison of basic functions of OFHE engine and Diesel engine, certain of the benefits of the OFHE engine and transportation devices power by OFHE engine as follow:

1. Shock tube of OFHE engine provides a replacement for the whole Diesel engine and its accessories. Therefore the active group of OFHE engine is simple and reliable.

2. Passive group of OFHE engine may be for different transportation devices to be served by OFHE engine. For instance, aircraft and automobiles may have different passive group.

For Diesel engine there is no different passive group: for aircraft and automobile have same Diesel engine.

1. The power flow drawn from the buffer by passive group is to match the power requirement, thereby the control of the passive group is at the well of the operation of the transportation devices. For instance, aircraft can take off and land vertically at speed, and accelerate in sky in order to maintain the comfort of passengers traveling in the aircraft. In driving the OFHE engine automobile, the power flow drawn from the buffer of power flow is matched with the driving of the OFHE engine automobile, and accordingly there is no sense of uncomfortable acceleration or deceleration.

2. Working processes of the active group are controlled by a real time control program which is instant action and reliable, and the working processes and operation of the transportation device are controlled by the computer. There is no manual operation involved. Therefore, entire transportation devices powered by OFHE engine are automatically operated in order to provide comfortable and safe transportation for passengers.

3. The working processes of Diesel engine are not adaptable to computer control. Operations of transportation devices powered by Diesel engine are dependent on a highly skilled expert vehicle operator due to the manually intensive nature of operation of the vehicles. Many aircraft disasters are the result of operator error, and accordingly automatic operation of an aircraft powered by an OFHE engine may decrease the likelihood of future disasters.

4. We have derived a logical criterion for rational thermo-efficiency η_rational as:

$$\eta_{rational} = \frac{\text{power output of engine}}{TPH_m^{max}}$$

$TPH_m^{max}$ is maximum thermo potential heat of the specific fuel used for the engine. $TPH_m^{max}$ can be obtained by simple lab testing: take a unit weight of fuel and put in a container. The fuel is increasing its temperature by electricity up to its maximum. The total amount of electricity being used by the electricity in Kw-Hr is the $TPH_m^{max}$ of the fuel.

For OFHE engine $\eta_{rational} > 70\%$

The emission of OFHE engine is less than 50% of Diesel engine of same powers.

Moreover, the active group is working under flow of fluid controlled by real time computer program and the passive group is working in smooth condition. The transportation devices produce less noise.

It is to be noted that only active part of OFHE engine consumes fuel and produces power, therefore the above said rational thermal efficiency is for all transportation device using OFHE engine as power provider.

Conclusions:

1) OFHE engines powering transportation devices may replace the conventional engines powering such transportation devices. The renovated transportation devices may be powered by an OFHE engine comprising a shock tube, which may replace convention engine assembly components. There is no special necessary technology utilized to make such an OFHE engine. Moreover, the OFHE engine utilizes less materials and manual labor required to produce such an engine compared with conventional engines. Moreover, the working processes and operation of transportation devices powered by OFHE engines are all by computer programs which provides instant operation, reliable operation, and safe operation.

2) OFHE engine powered transportation devices can be used for both civil and military purposes.

3) For military application the OFHE engine may be used to upgrade weapons, such as battle aircraft, and short range missiles, and other weapons equipped with OFHE engine. The tactic and strategic of the warfare will be totally changed.

4) Before the front of revolutionary event, every manufactory transportation device powered by internal combustion engine have to consider to update their product otherwise their product will be abolished by world market.

Build and Operate the OFHEa and OFHEe Engines

Figure 11:
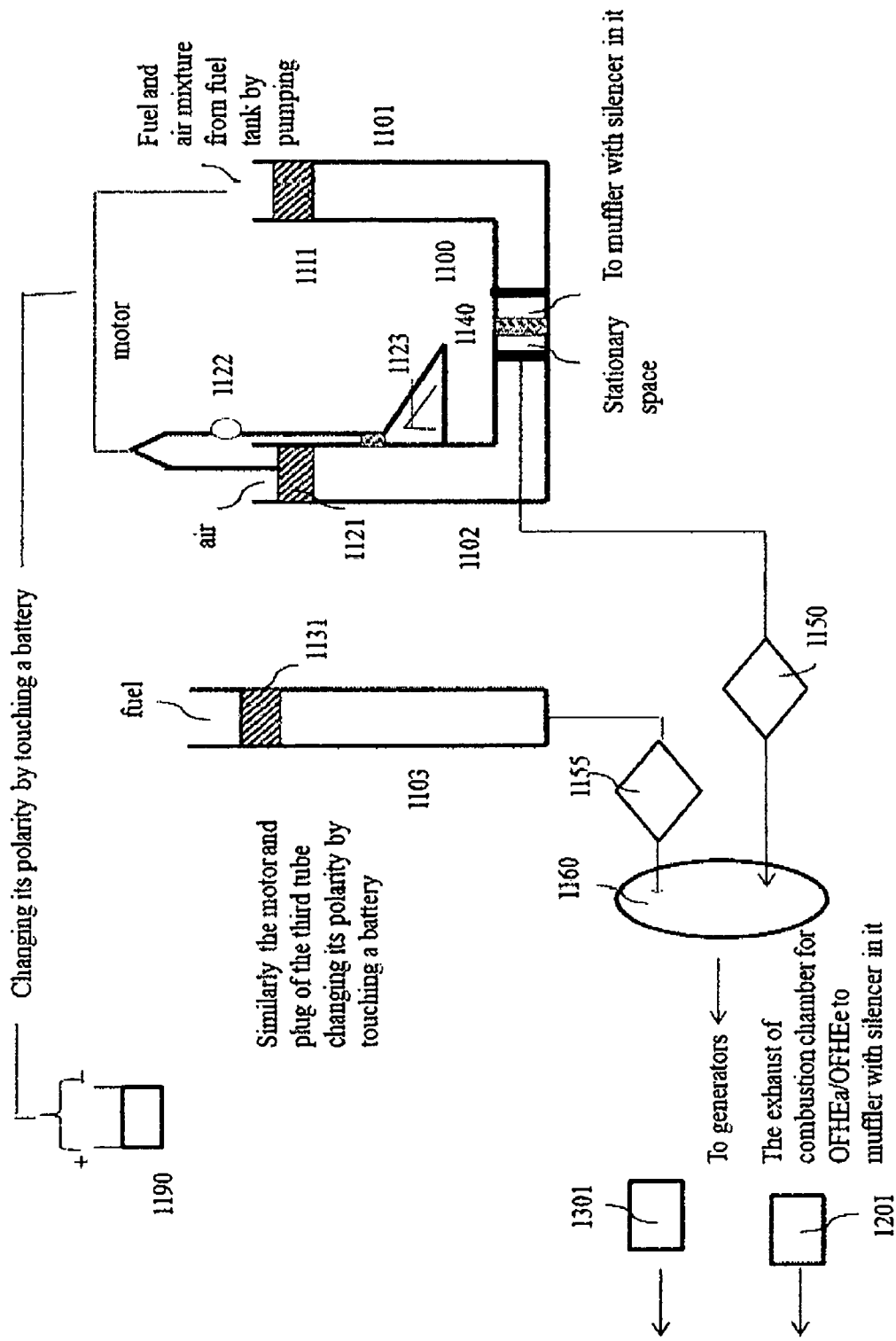
FIG. 11 is a detailed schematic diagram of an OFHE internal combustion engine according to various embodiments.
Figure 12:
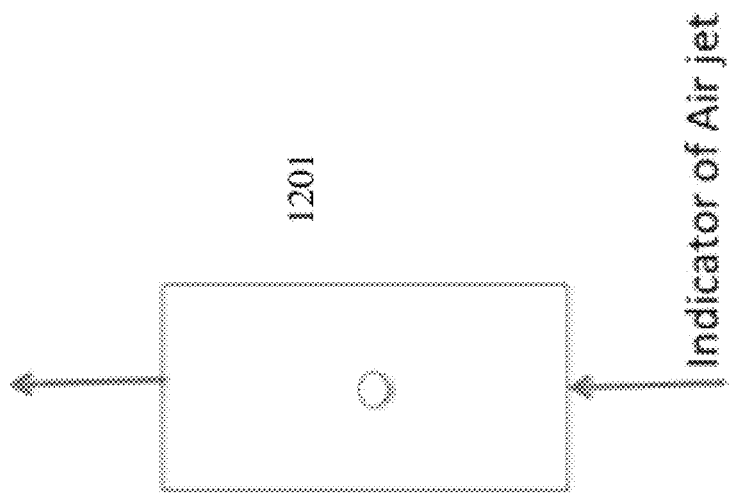
FIG. 12 is a schematic diagram of an air generator according to various embodiments.

The active group of a shock wave system mainly consists of the following components shown in FIG. 11: the first tube (1101), the second tube (1102), the third tube (1103), the shock wave air buffer (1150), the combustion chamber (1160), and the separating plate (1140) that can separate the stationary space into two parts, the left and the right parts. The first and the second tubes are connected by a horizontal pipe that forms the U-shaped tube shown in FIG. 11. The stationary space is the center section of the horizontal pipe at the bottom of the U-shaped tube.

In the first tube (1101), there is a plug (1111) that is driven by its motor. Associated with the second tube, there are two motors. One motor drives the plug (1121) inside the first tube; the other motor (1122) is outside of the second tube and drives the vertical movement of the triangle shaped tip (1123).

First, we consider the fuel system supplying for OFHEa and OFHEe engines.

Figure 10:
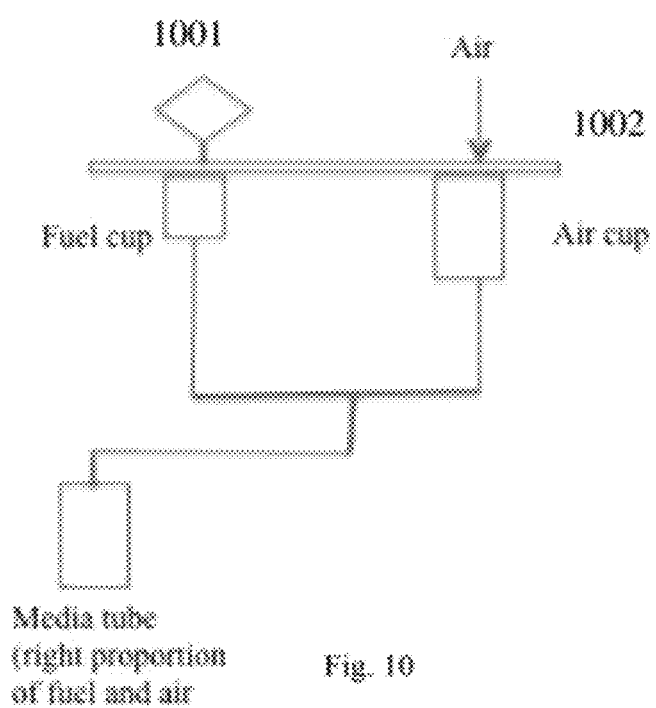
FIG. 10 is a schematic diagram of an OFHE internal combustion engine assembly according to various embodiments.

Refer to FIG. 10, the fuel from a fuel tank (not shown) is pumped into the fuel buffer (1001) with a hole in mixing plate (1002). On the other side of mixing plate (1002) there is a hole for air. The fuel and air have a mixture as shown in FIG. 10. The pump has its power from the power line, and follows the "on" or "off" of the power line.

The mixture is sent to the first tube of the U-shaped tube. A structural arrangement is provided which just touch the edge of above said tube.

After the above said mixture filling the first tube (1101), the plug (1111) driven by a motor pushes downward starting from its top position, and presses the mixture to the middle of bottom pipe of the U-shaped tube. Meanwhile, in the second tube the plug (1121) driven by another motor also pushes downward starting from its top position, and presses the air to the middle of bottom pipe of the U-shaped tube.

At the middle of the bottom pipe of the U-shaped tube, there is a stationary space on both sides of the separating plate (1140) as shown in FIG. 11. This is the space to exchange the heat energy of media and air by a shock wave. When the separating plate (1140) is pushed downward, there is a shock wave which transfers the heat energy of media (which is fuel and air mixture at the beginning) to air. The product of transferring heat energy is carried in a stationary space which is held on both sides of the separating plate (1140). On the left side of this stationary space, there is an opening which collects the gas of high temperature pressure and passes it to the shock wave air buffer (1150). On the right side of the stationary space, the structure collects the deenergized media and sends to muffler with shock absorber in it. The media with the shock wave heat energy decreases and is exhausted with similar structure as that of the left side which has a muffler collecting the exhaust gas with a silencer in it.

When the third tube is filling with fuel which is of the same amount as that of the first tube, the plug driven by Its motor in the third tube pushes the fuel to the pressure as high as that of the air in the buffer (1155). The air and fuel are injected into combustion chamber in which the fuel and air are mixed and burn completely. If the exit gas is sent to an air generator (1201), it is the OFHEa engine.

The hot gas from the combustion chamber (1160) can drive an air generator (1201) to produce air jet. The air generator (1201) has an "on/off" switch as shown in FIG. 11. This is the OFHEa engine.

Figure 13:
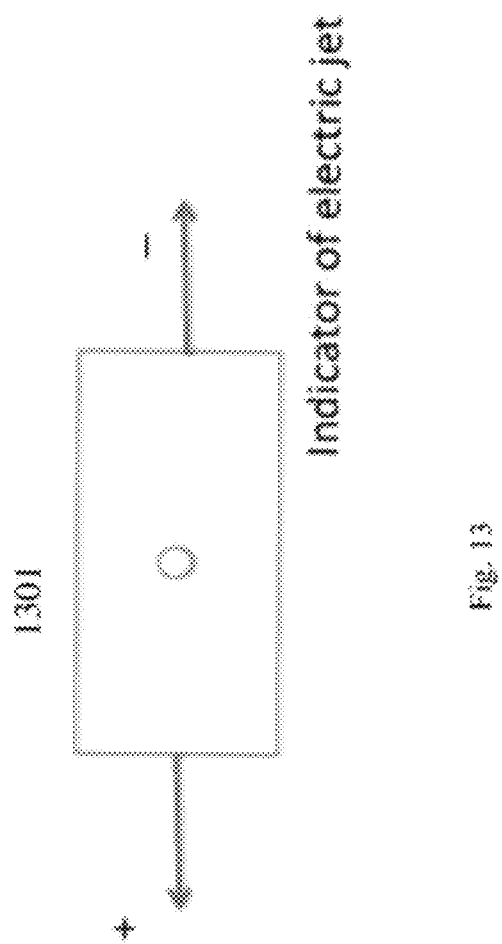
FIG. 13 is a schematic diagram of an electricity generator according to various embodiments.
Figure 14:
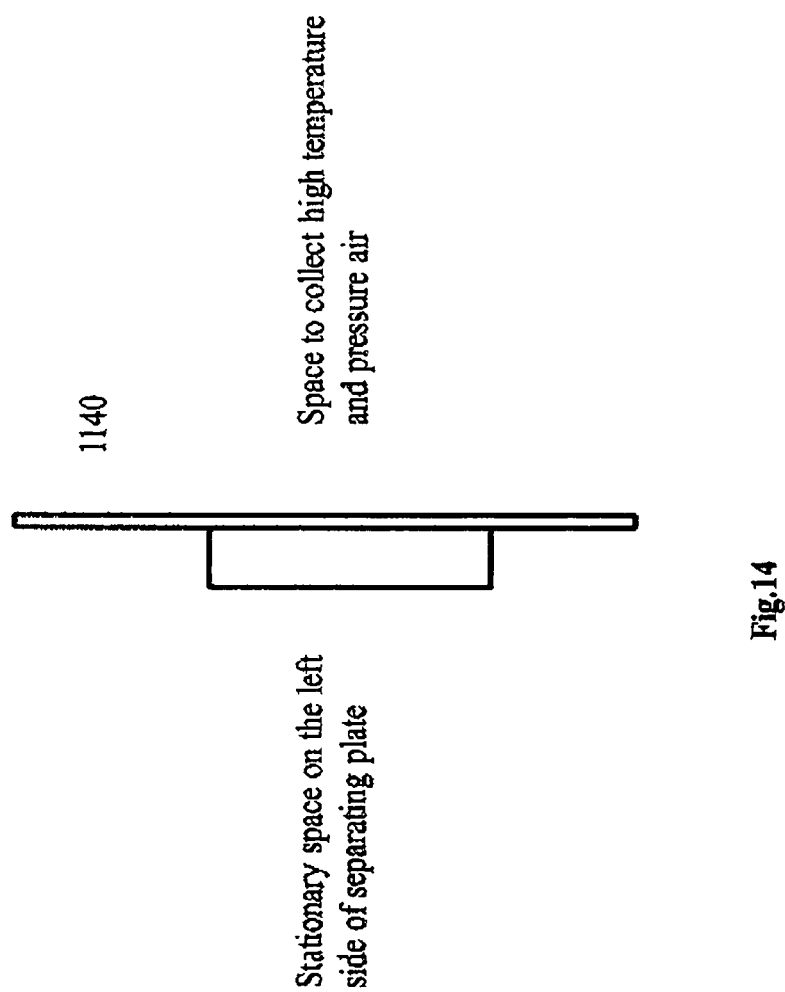
FIG. 14 is a schematic diagram of a separating plate according to various embodiments.

The hot gas from the combustion chamber (1160) can also drive an electric generator (1301) to produce electricity. The electric generator (1301) also has an "on/off" switch as shown in FIG. 13.

The exhaust gas of the OFHEa engine or the OFHEe engine is directed to a muffler with silencer in it (not shown).

Once the hot gas are release from the combustion chamber (1160), the shock wave engine completes one cycle. The plug in the three tubes and the triangle shaped tip (1123) will all be driven back to their initial top positions quickly by their motors, in order to become ready for repeating the above cycle again.

Synchronization between the different components in the shock wave system is critical. First, the pumps in the first tube and the second tube must be synchronized such that the pressure of the fuel mixture in the left part of the stationary space and the pressure of the air in the right part of the stationary must reach to the required shock wave pressure at the same time before the separating plate (1140) opens. This synchronization can be assured by proper electric circuit that provides power to the two motors driven the two pumps. Secondly, as soon as the pressure of the media in the stationary space reaches to the required shock wave pressure, the separating plate opens and triggers the shock wave effect in the stationary space. This synchronization is implemented by electric and mechanical structures. The second motor (1122) associated with the first tube and its driving object, the triangle shaped tip (1123), are adjusted such that when the triangle shaped tip (1123) touches the trigger stick the separating plate (1140) the required shock wave pressure is established in the stationary space. Third, the plug (1131) in the third tube establishes the pressure of its fuel equal to the pressure from the shock wave gas in the combustion chamber when the separating plate (1140) opens. Finally, all the three pumps and the triangle shaped tip move back to their initial positions before the next cycle begins.

The working process of the shock wave engine can be summarized as the following steps.

1) Fill the first tube (1101) with mixture of fuel and air of proportion as shown in FIG. 10, with fuel cup and metering mechanism.

2) The fuel mixture in the first tube (1101) and the air in the second tube (1102) are pressed by the plug in each tube driven by each motor.

3) Drive the motors by battery power provided by battery (1190).

4) When it near the bottom of u tube (1100), the triangle shaped tip (1123) driven by motor (1122) opens the separating plate (1140).

5) When the separating plate is opened by the triangle shaped tip (1123), there is a shock wave which transfers heat energy of media to air.

6) The high pressure air is collected by tube which passing though the wall of tube and carrying to a buffer (1150).

7) The three motors withdraw from its bottom to top by changing the polarity of line by touching the battery.

8) In the third tube (1103), the motor and the plug (1131) compresses the fuel forward to bottom. The fuel is from fuel tank with a metering cup. The amount of fuel is same as that of first tube (1101).

9) The hot air in buffer (1150) and fuel from the buffer (1155) both hot air and fuel are sent into the combustion chamber (1160).

10) If the exit of combustion chamber pushes an air generator (1201), it forms the OFHEa engine. If the exit pushes the electric generator (1301), it forms the OFHEe engine.

11) The above 10 steps are the "Operate the OFHEa and OFHEe engine". The fuel and air get complete burning within the combustion chamber (1160). This is the optimization of OFHEa and OFHEe engines.

The OFHEa engine and OFHEe engine can be used to drive civil and military vehicles. Both engines, i.e. the OFHEe and OFHEa, are shock wave engines. It has high thermal efficiency in comparison with Diesel and Otto engines, and may provide an improved efficiency such that only ⅓ of the amount of fuel used by convention engines is necessary to product the same amount of work by the OFHE engine.

Figure 15:
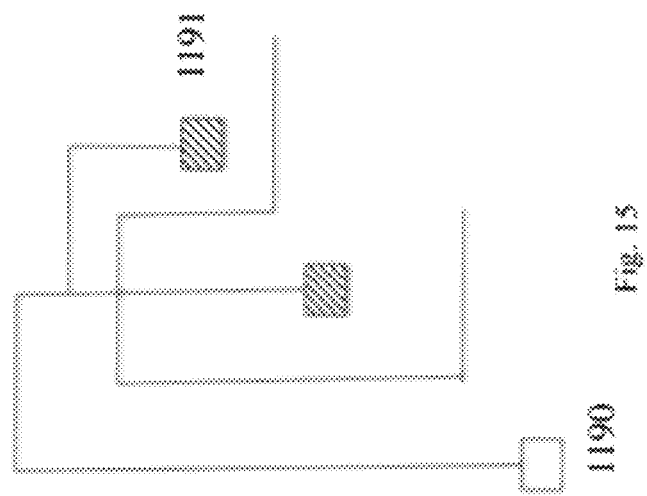
FIG. 15 is a schematic diagram of a battery control system according to various embodiments.

In various embodiments, a plug with motor (e.g., plug and motors 1111, 1121, 1122, and 1131) and outside the tube are lifted upward by changing the polarity of battery 1190 to reverse the direction of travel of the motor, as shown schematically in FIG. 15.

Example Physical Size of OFHEa and OFHEe Engines.

The OFHEa and OFHEe engines have no moving mechanical mechanism as of Diesel and Otto engines. The OFHEa and OFHEe have three tubes and fluid flow in it. FIG. 11 provides a schematic illustration of the process of the engine.

Example size of 3 tubes:

The three tubes may have same size

As a non-limiting example, the size of the three tubes may be 25 mm diameter, with a height to diameter ratio of 4:1.

To Build Four Wheel Car with OFHEe Engine.

The OFHEe engine has its electricity directly charge the battery of the existing battery-powered electric car. In doing so, the battery of the car can be reduced to one set that is adequate to provide the needed voltage. The driving time of the car will be limited to the amount of fuel carried, rather than the amount of electricity stored by the battery. The recharging facilities and recharging time are both eliminated.

The OFHEe engine may be positioned in the head of the car. The fuel tank is also within the car with its fuel filling opening outside of the car. After filling the fuel the fueling opening is close with a screw cap.

The operation of the OFHEe powered car is the same as that of the battery-powered electric car. Internally, when the driver turn on the switch which connects the power line of the car, the OFHEe engine is started. Any driver who can drive a battery-powered electric car will be able to drive the OFHEe-powered car.

Superiorities of OFHE engine automobile over conventional automobile.

1) Over the OFHE engine may provide higher overall thermo efficiency than conventional automobile, due at least in part to the fact that OFHE engine is a shock wave feedback engine, while engines used in conventional automobiles are mechanical work feedback engines.

2) An automobile having the same power output, the OFHE engine consumer less fuel than any conventional engine.

3) The power to weight ratio of an OFHE engine is higher than a conventional automobile engine.

4) The active group of OFHE engine is a system of flow of fluid, the power output is the media flow power output of combustion chamber. While engines of all conventional automobile power output is mechanical work. The later makes active group and passive group bounded together. It is the fundamental fault of all conventional engines.

5) There are only 4 general mechanical parts. No special metal or technology is necessary to make theses mechanical parts.

6) The cost of make OFHE engine automobile and maintenance of OFHE engine automobile are much less than automobile convention automobile engine.

7) Every automobile factory may change their present production of automobile into similar OFHE engine automobile easily, with no special technology or high investment.

8) OFHE engines are environmentally friendly, and conform with many global rules, laws, and regulations requiring automobiles to reduce emissions.

Air Floating of Railway Train, OFHEa to Drive a Railway Train and its Locomotive.

For ordinary railway train and its locomotive, it is driven by the Diesel engine. After replaced Diesel engine by OFHEa engines, the train and its locomotive remains the same.

The train and its locomotive are supported by the frame works. At each foot of frame work, an OFHEa indicator bounded with the frame work foot with the indictor. The direction of indicator is against the railway and push the train 3 mm upward. The direction indictor's proper, OFHEa engine, is on outside nearby. It is symbolized by power with fuel tank to be drawn fuel. The locomotive has its power with its indicator pointing railway behind the pilot. The control of above said indicator is by the pilot in the form of a push rod. The working processes of the two sides can be changed into the position of push rod, which is controlled by the pilot. When the push rod nearby the pilot, the speed of locomotive is slow. Similarly, when the push rod pushes forward, the speed of locomotive is high. When the train and locomotive stand without moving the fuel supply the train and locomotive is stopped.

The speed of locomotive is indicated by speed meter before the pilot. There is a refraction mirror at the left side of pilot to see whether the locomotive is leaving the platform.

It should provide underground tunnels to let car, people, and animals to across the air floating railway train.

OFHEa Engine to Run Air Bus

The fuel supplying of OFHEa engines are from fuel tank by pump. The power of pump are from battery. Therefore in the left side of the frame work there are 3 pumps, one for each OFHEa engine.

A strong frame work is built to fasten the ordinary bus. The pilot is fixed to the left side of the frame. There are two OFHEa engines fixed on the left side. The indicator of the above said OFHEa engine are always pointed downward. Two parallel connected batteries is fixed on the left side of the framework. The battery power is located within easy reach location of the pilot.

Two cap rotors is fasted at middle of the front bar of the framework and working parallel with the ground. The fuel supplying tank of OFHEa engines are fixed on the appropriate location. Two exhaust gas muffler with silencer are fixed on the upper and downward of the OFHEa engine proper.

In running the airbus, the two OFHEa engines are running to balance the weight of whole air bus. The power supplying of the caped rotor is from the battery power through lines. The lines are passing a power resist material and the reaches the battery power. A short stick is powered by OFHEa engine, and operated its indicator by pilot.

In running the airbus, the pilot has the option stopped at any location of the land. For example, the airbus from Shanghai to Beijing, the airbus has four stops. In the travel, it has across a wide river. At each station, the pilot has the indicator points downward to the station and the conductor of the bus let the passengers discharge and new passenger to come in and close the door. The airbus is running forward as usual.

It is important that the weight and frame work must in same mechanic gravity plane.

The airbus can travel in wide ocean with a compass. For example from France to New York, with the help of compass in the pilot place.

The airbus has no moving mechanical part except the caped rotor. It is important to change the cap rotor after using several hours. The batteries should be replaced also.

Methods of Providing an OFHE Engine Aircraft and Navigation of the Aircraft.

1$^{st}$ Step

Figure 20:
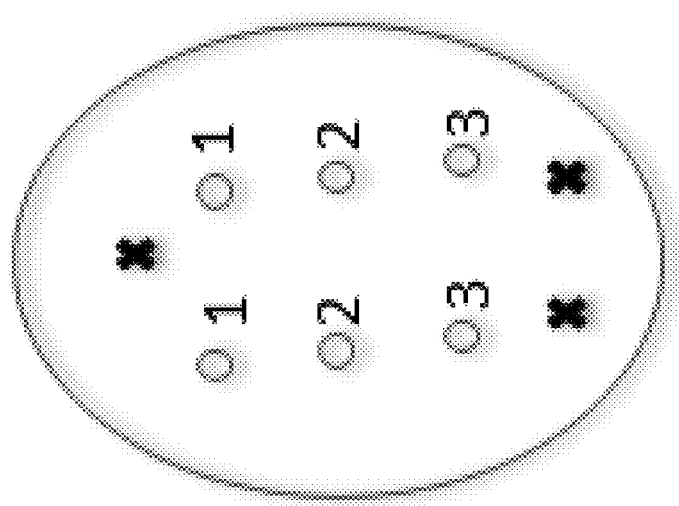
FIG. 20 shows a schematic diagram of a bottom of an aircraft fuselage being powered by an OFHE engine.

The fuselage may be similar to conventional aircraft. It has facilities of toilet and seats. The fuselage has no extended wings, nor the rudder. FIG. 20 provides a bottom view of a fuselage of an aircraft powered by an OFHE engine.

There are two kind independent air jet supports, each supports have an air jet. It takes its power from the media power flow buffer as that of the automobile.

Jet 1 may be configured to propel the fuselage forward. Jets (2) and (3) may be configured to propel the fuselage upward. The left and right rows of jets may be similarly configured to provide the same work. The two left and right jets may provide balanced power output with computer control its balances. The landing gears may be same as that of conventional aircraft landing gears. It is important to note that for shock wave engine aircraft the landing gears are touched the ground very gently without any shock that of conventional aircraft. Therefore it is safe and comfortable for passenger. The gentle landing and takeoff of an aircraft powered by an OFHE engine may decrease the likelihood of disasters, which often occur during landing and take-off.

Navigation

Figure 21:
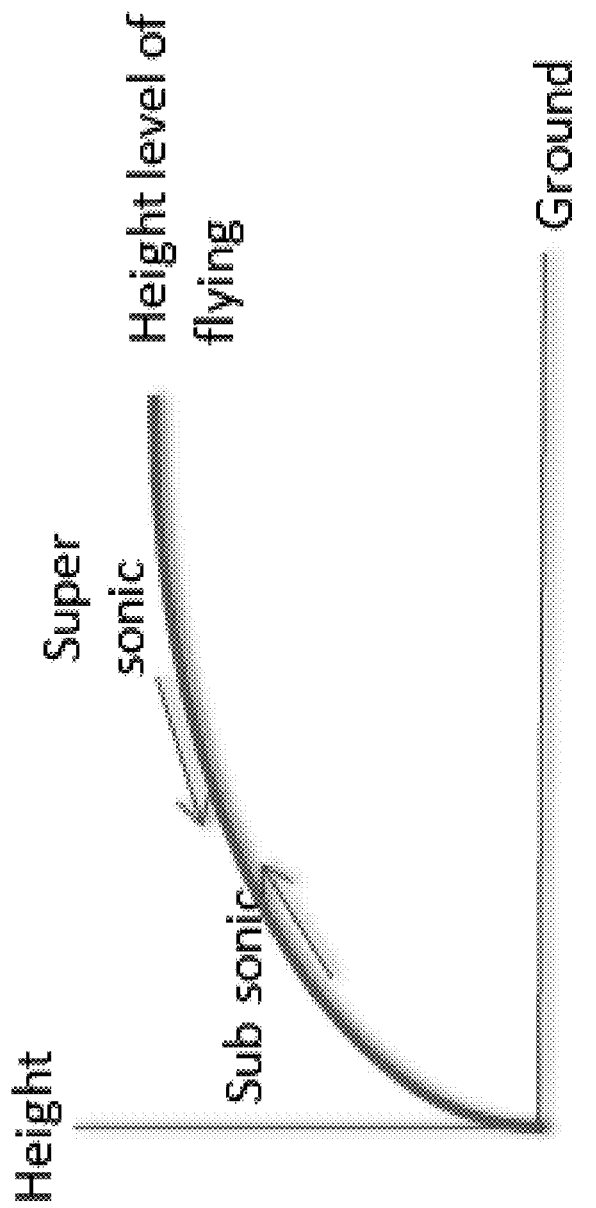
FIG. 21 shows a schematic diagram of the flight speed of an aircraft powered by an OFHE engine at various altitudes.

FIG. 21 shows the passive group draws sufficient power media flow from the buffer of media power flow, to maneuver the fuselage during flight.

The accompanied figures shows the lift force being controlled by computer, which may be controlled to provide reliable, safe and comfortable operation for passengers.

For domestic flight, the overall flight time may be low, since the flight speed in sky is much higher than conventional aircraft. Domestic flights across a continent may only take a few hours. When the new aircraft reaches the destination airport, the new aircraft may land at the destination airport with speed reversed as that of take off. The three point landing gears touch the ground without shock. The balance computer control of the forward propulsion air jet is disengaged. A pilot of an aircraft having an OFHE engine may operate the aircraft in a manner similar to that of conventional aircraft. Accordingly, the aircraft may be directed to a destination to discharge the passenger as conventional aircraft. Then return to the original spot and for seat cleaning of aircraft and toilet as usual aircraft.

For long distance trips, such as from New York to London. The operation of the aircraft utilizing the OFHE engine is similar to that of a conventional aircraft, however the speed of flight may be supersonic. The flight will be still few hours.

Provided above are the explanatory steps to make OFHE engine aircraft (shock wave engine) and operation of the same. The benefits of OFHE engine aircraft and its navigation in comparison with that of present convention aircraft have at least following points:

1) To build OFHE engine aircraft is much simple than that of the present conventional aircraft. There are no special material and technologies needed to make OFHE engine aircraft compared to that used to generate an engine of a conventional aircraft.

2) The weight of new aircraft is much lower than that of present aircraft.

3) All the working processes of the new aircraft are controlled by computer programs, which are instant in action, reliable and provide comfortable and safe operation for passenger to travel with the new aircraft than that of present aircraft.

4) The speed of flight of new aircraft is much higher than that of present aircraft.

First of all, we should make it clear that the present aircraft jet engine is a Diesel engine similar to that being used for automobile, but have a reciprocating mechanism changed into the rotors of jet engine, and the crankshaft being strengthened to straight shaft.

The steps to build active group of aircraft are same as that of aircraft. The fuselage of shock wave engine (OFHE engine) is same as that of present aircraft but without extended wings on it and without a rotor such as those of present aircraft. It has same passenger's accommodations.

As shown in FIG. 20, the bottom of the fuselage has four jets supplied by the active group of shock wave engine (the OFHE engine). Accordingly, the mechanism for providing power to the jets are similar to that of an automobile (but may have a higher overall power output than an automobile engine). In various embodiments, there are two powers supplying power to jets of the left and right rows of jets.

The passive group draws media flow power from the buffer. The drawing power is achieves by a turbo-generator set.

There is interface "buffer media power flow".

As described above, a convention engine has no interface "buffer media power flow".

In various embodiments, the fuselage of aircraft has two parallel three set of air jet to make the aircraft operate, which is shown in the bottom view of the aircraft as shown in FIG. 20.

In various embodiments, the fuselage is a streamline body. The support 01 is an air jet to propel the fuselage forward. The air jets 02 and 03 are air jet to lift the fuselage upward. In various embodiments, the landing gear utilized on an aircraft utilizing an OFHE engine are similar to those of conventional aircraft, and are deployed during landing and take-off operations of the aircraft.

The air jets 2 and 3 are used to lift of the fuselage, the air jets receive power from the turbo generator set and obtains power from the buffer. Another air jet 1 uses another turbo-generator set, and obtains power from the same buffer.

The air jet 2 and 3 are coordinated with air jets to lift the fuselage to pre-set height and speed which is most comfortable for the passengers in the fuselage. The speed may be supersonic and/or subsonic to provide appropriate flight times over various distances.

The fuel of active group to supply the buffer of media flow power has another turbo-generator set similar to that supplied for air jet 2 and 3, as well as jet 1 to supply the fuel at fuel motoring buffer under the fuel source of valve 15 of FIG. 16 of OFHE engine active group.

Aircrafts having an OFHE engine may be operated and navigated in a manner similar to that of conventional aircraft. For example, the speed of aircraft at a destination airport is similar to the speed of the airport at an origin airport. At the point where the aircraft is near the ground, landing gears of the aircraft drop down, and the jets 2 and 3 propelling the aircraft upward are stopped. Jet 1 of both side are controlled by pilot propel the aircraft to a place ordered by personnel of the destination airport to discharge passenger in fuselage. After that, the aircraft return to place ordered by destination airport to prepare for the next flight. All the practices of the destination airport are as usual.

Following will that OFHE engine can be used in some major transportation vehicles. It includes 1) automobile, 2) air floating railway trains 3) airbuses 4) military fighter. Many other transportation vehicles may be similarly developed.

Military Fighter

Like an airbus, two computer controlled points may be provided, so that the fighter can be lifted and lowered by computer controller. When the fighter is lifted to one level to locate the target on cross, the operator may control the gun following the cross to direct a bullet toward the target. Moreover, the operator may have one or more user control devices to easily lift and direct the military fighter.

It is to be noted that the OFHE engine may provide an energy savings of between about 50%-80% energy reduction compared to convention engines.

OFHE Engine Charging a Battery

1) The polarity OFHE engine should be same as that of button.

2) Charging the electrical components may be accomplished in a manner similar to that used in a conventional automobile system.

3) The headlights may be operated by a switch when needed.

4) The battery may produce and store power utilized for various vehicle functions, including the windshield wipers and air conditioner.

5) On both ends of OFHE engine, there have high pressure exhaust it should be collect by muffler with silencer it.

OFHE Engine Used in Four-Wheel Automobiles

1) The wheels may be protected by plastics.

2) Each wheel has cable suspended on car frame, and entered at the moving part. At same time with cable drawers for the moving part, the moving part is covered by plastic cover.

3) The OFHE engine supplies power for the car to provide at least the following operations a) saving power while the vehicle is stopped b) providing a small amount of power to move the vehicle slowly c) driving the car d) driving at a normal speed d) driving at high speed e) driving at a maximum speed as limited by a road authority.

At both ends of OFHE engine there are high exhaust buffer with a silencer to cover. There is a push rod near the steering wheel that may be used to control the amount of power provided by the OFHE engine.

OFHE Engine for Use in an Airbus and/or a Heavy Car

The airbus may have two OFHE engines to lift it. In such embodiments, the control system may have two push rod to control the airbus up and down.

There are two caped rotors to push the airbus forward.

At the station, the caped rotor is stopped, and the pilot lowers the airbus to let passengers discharge and to let new passenger enter the airbus.

The airbus may have an oxygen system onboard to maintain a comfortable atmosphere for the passengers.

OFHE Engine for Use in Building an Air Floating Railway Car

The floating railway car may have one or more OFHE engines configured to lift the floating railway car a distance off of a support surface (e.g., 3 mm) and to propel the floating railway car forward.

The driver may utilize the computer controller to regulate the speed of the vehicle, for example, while entering or leaving a station.

Both ends of OFHE engine have high pressure exhaust to be control by muffler with shock absorber in it.

At a stop, the capped rotors are stopped to discharge passengers and/or to permit additional passengers to enter.

The floating air railway car may have an oxygen system onboard to maintain a comfortable atmosphere for the passengers.

In change the direction, the right one caped is stopped, and going on as before.

OFHE Engine for Use in Building a Train Over Buses

The structure is same as that of construction of an airbus. However, an airbus may be powered by four large powered OFHE engine and few capered isolated rotors configured for operation at supersonic speed. At Both ends of OFHE engine, the big pressure exhaust collected by mufflers with silencer in it.

When near the destinations, the vehicle may slow down and stop to allow passengers to discharge and to enter the vehicle.

OFHE Engine for Use in Transportation Devices Across Long Distances Via an Aircraft For example, transocean from Charles de Gaulle airport to New York.

An aircraft without a wing may have 4 OFHE engines and 4 caped rotors. The 4 OFHE engines may be configured to lift aircraft to approach high altitudes over oceans. The 4 caped rotors powered by a heavy duty battery start running and increasing up to supersonic at increasing speed let the passengers stand comfortably. When the aircraft near New York airport ground service order the caped rotor to have its speed to slow down till stop. The aircraft reaches its destination with two exit caped rotors operating at low speed. The aircraft stops the two low speed caped rotors to discharge the passengers. Then return to previous position and prepare the inside of aircraft: replace 4 new heavy dirty batteries and fill the fuel tanks of OFHE. Then to let the new passengers enter the aircraft. Adjust the aircraft to same direction as before, and complete one trip.

The trip may directed by satellite or other measures.

OFHE Engine Used to Launch a Missile

The missile is powered by the OFHE engine. When the missile is launched, the air force follows the missile up to the target. If the missile did not reach the target, another air force may support the previous force up to the target. It is to be noted that the air force from OFHE engine can be followed secretively.

OFHE Engine Used for Building a Sky Fierce

Two OFHE engine support the pilot to sky, and find the target. When the pilot finds the object within the cross, the gun was fired to destroy the object. There are two motors to help the pilot to find the objects. One motor is controlled by the right battery with computer controlled. The direction to viewing the right sky if it find the target in the cross, the gun will fired. Similarly the jet battery controls the left sky. In such a way search the target in sky, the sky be searching is wide enough. After the mission is finish. The pilot is return the ground by the air force supporting the pilot in sky. Finally the pilot return the ground and the OFHE engine is closed.

An OFHEa Engine to Build Sky Target Searcher

The OFHEa engine is in upward position and under the seat of searcher. The OFHEa engine is at low power to push the searcher upward. The searcher start search the target. If the target within the cross, the gun is fired and a photo will record it. The searcher is lift up by OFHEa engine, the searcher searches the sky target. The motor on the left side of the searcher and powered by battery with a computer. The sky searcher has widened the sky searching area of sky. Similarly to the right side the sky searching area. The searcher is lift upward by the OFHEa engine doing same searching work. After the searching work finished, the searcher return to its original seat position. It is doing by gradually closing the fuel metering. After closing the OFHEe engine, the searcher leaves his seat and steps downward his seat to the ground level. A car lift him to head quarter.

Key technologies applied on OFHE engine.

1) The OFHE engine system is a system of flow of fluid. Mechanical parts of the system are used to guide the flow of fluid to produce maximum media power flow at the exhaust opening of combustion chamber.

2) As discussed herein, media flow power is rated by thermo potential power (TPHm) which is defined with reference to the OFHE engine.

3) OFHE engine uses heat energy feedback (FHE). As discussed herein, FHE may be achieved by utilizing a shock tube. In which the high heat energy level difference between media and air produce shock wave to feedback heat energy of media to air instantly. Shock tube has being used in labs. It is a reliable and safety device. Shock tube ensures the reliable instant action of active group of OFHE engine.

4) Optimization of OFHE engine is achieved by introducing ½ of an amount of fuel to be utilized in a complete combustion process into the OFHE engine, to the third column of pumps and valves to produce pressure as that of modulated air which is stored in the air buffer. The same pressure fuel and modulated air in air buffer are injected on a shock absorber in combustion chamber. The fuel and modulated air are fully mixed and produced high level media power flower approaching its maximum (TPHm approaches $TPH_m^{max}$) at the opening of combustion chamber.

5) As discussed herein, in various embodiments, there is a one-way media power flow buffer between active group and passive group.

In various embodiments, the OFHE engine assembly is self-content. It can be applied for any transportation devices. In various embodiments, the active group produces power, while the passive group monitors the transportation device.

In various embodiments, the active group consumes the fuel, and the passive group does not consume fuel. The rational thermo efficiency of OFHE engine is greater than its counterpart engine by more than 50%.

Working processes of active group are (controlled by a small motor and real time control program).

The working processes of passive group are controlled by synchronization computer system.

OFHEa and OFHEe engines have put aside the Diesel and Otto engine. OFHEa and OFHEe engine can be used for any civil transportation devices to replace the old ones. Later on strategic and tactic of warfare should be reorganized, in consideration of OFHEa and OFHEe engine.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. An engine comprising:
a shockwave mechanism; and;
a computer system;
wherein the shockwave mechanism comprises:

a first fuel supply tube that contains a first motor driven plug configured to pressurize a first portion of fuel to a first fuel pressure within the first fuel supply tube;

an air supply tube that contains a second motor driven plug configured to pressurize a first portion of air to a first air pressure within the air supply tube;

a stationary space with a separating plate operable between a closed position in which the first portion of fuel at the first fuel pressure is separated from the first portion of air at the first air pressure, and an open position, in which the first portion of fuel and the first portion of air mix to form a combustion air shockwave; and an air buffer zone in fluid communication with an opening of the stationary space, wherein the opening is configured to collect the combustion air shockwave from the stationary space so as to generate hot air therefrom;

a combustion chamber having a second fuel supply tube having a third motor driven plug configured to pressurize a second portion of fuel to a second fuel pressure within the second fuel supply tube, wherein the combustion chamber receives the second portion of fuel at the second pressure from the second fuel supply tube, a second portion of air, and the hot air from the air buffer zone, wherein the second portion of fuel at the second pressure from the second fuel supply tube, the second portion of air, and the hot air from the air buffer zone undergo complete combustion within the combustion chamber thereby generating combustion products, wherein the computer system is configured to control the shock wave mechanism and the combustion chamber.

2. The engine of claim 1, further comprising an electric generator in fluid communication with the combustion chamber so as to receive the combustion products or a portion of the combustion products, wherein the electric generator is configured to generate electricity upon receiving at least the combustion products or the portion of the combustion products.

3. A vehicle comprising an engine of claim 1, wherein the engine is configured to propel the vehicle.

4. The vehicle of claim 3 wherein the vehicle is selected from the group consisting of a 4-wheeled vehicle, a bus, a tank, a train, a floating train, a marine vehicle, and an amphibious vehicle.

5. The vehicle of claim 3 wherein the vehicle is an airborne vehicle, wherein the airborne vehicle is selected from the group consisting of a manned aircraft, a UAV, a missile, and an amphibious aircraft.

6. A vehicle comprising an engine of claim 1, wherein the engine is configured to provide lift for the vehicle.

7. The vehicle of claim 6, wherein the vehicle is selected from the group consisting of: a manned aircraft, a UAV, and an amphibious aircraft.

8. The vehicle of claim 6, wherein the engine is configured to propel the vehicle.

9. The vehicle of claim 6, wherein the engine is configured provide power to a plurality of jets to propel the vehicle.

10. A fire hydrant for a high-rise building comprising the engine of claim 1, wherein the engine is configured to provide power to the fire hydrant.

11. The engine of claim 1, wherein the combustion chamber does not have a spark plug positioned therein.

12. The engine of claim 1, wherein the combustion chamber further comprises a shock absorber.

13. The engine of claim 1, wherein the computer system is configured to control at least one of: valves, four-bar linkages, pumps, the separating plate, and a jet output configured to direct the combustion products.

14. A method of operating an engine comprising:
providing a shockwave mechanism comprising:
    a first fuel supply tube;
    an air supply tube;
    a stationary space with a separating plate having a closed position in which the first fuel supply tube and the air supply tube are fluidically isolated, and an open position in which the first fuel supply tube and the air supply tube are in fluid communication; and
    an air buffer zone in fluid communication with an opening of the stationary space;
providing a combustion chamber comprising a second fuel supply tube;
providing a computer system;
closing the separating plate into the closed position;
compressing a first portion of fuel within the first fuel supply tube to generate pressurized fuel;
compressing a first portion of air within the air supply tube to generate pressurized air;
opening the separating plate into the open position whereby the pressurized fuel and the pressurized air mix thereby generating a combustion air shockwave which passes into the air buffer zone via the opening thereby generating hot air from the combustion air shockwave;
compressing a second portion of fuel within the second fuel supply tube to generate a second pressurized fuel;
providing additional air, the second pressurized fuel and the hot air to the combustion chamber resulting in the second pressurized fuel undergoing complete combustion within the combustion chamber thereby generating combustion products,
wherein the computer system is configured to control the opening of the separation plate and the closing of the separation plate.

15. The method of operating the engine of claim 14 further comprising: directing at least a portion of the combustion products to an electric generator to generate electricity thereby.

* * * * *